United States Patent
Kihara et al.

(10) Patent No.: US 11,895,284 B2
(45) Date of Patent: Feb. 6, 2024

(54) COLOR CHART FOR PERFORMING COLOR AND IN-PLANE UNEVENNESS ON AN IMAGE FORMING APPARATUS

(71) Applicants: Hideyuki Kihara, Kanagawa (JP); Yuta Nagata, Kanagawa (JP); Yusuke Taneda, Kanagawa (JP)

(72) Inventors: Hideyuki Kihara, Kanagawa (JP); Yuta Nagata, Kanagawa (JP); Yusuke Taneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/512,960

(22) Filed: Oct. 28, 2021

(65) Prior Publication Data

US 2022/0141356 A1    May 5, 2022

(30) Foreign Application Priority Data

Oct. 29, 2020 (JP) .................................. 2020-181882

(51) Int. Cl.
*H04N 1/60* (2006.01)

(52) U.S. Cl.
CPC ......... *H04N 1/6033* (2013.01); *H04N 1/6072* (2013.01); *H04N 1/6097* (2013.01)

(58) Field of Classification Search
CPC ............................................ H04N 1/60–6097
See application file for complete search history.

(56) References Cited

U.S. PATENT DOCUMENTS

| 4,980,544 | A  | * | 12/1990 | Winter | G06K 7/10851 |
|---|---|---|---|---|---|
| | | | | | 235/494 |
| 6,048,117 | A | | 4/2000 | Banton | |
| 10,129,438 | B2 | * | 11/2018 | Yamaguchi | H04N 1/6055 |
| 2006/0028699 | A1 | | 2/2006 | Venable et al. | |
| 2007/0153340 | A1 | | 7/2007 | Itagaki et al. | |
| 2008/0239344 | A1 | * | 10/2008 | Wang | G06K 15/02 |
| | | | | | 358/1.9 |
| 2008/0259365 | A1 | | 10/2008 | Matsuzawa | |
| 2010/0067025 | A1 | | 3/2010 | Agehama | |
| 2011/0286018 | A1 | * | 11/2011 | Hashizume | H04N 1/6033 |
| | | | | | 358/1.9 |

(Continued)

FOREIGN PATENT DOCUMENTS

| EP | 1091566 A2 | * | 4/2001 | ........... H04N 1/6033 |
|---|---|---|---|---|
| JP | 2007-181142 | | 7/2007 | |

(Continued)

OTHER PUBLICATIONS

European Search Report dated Mar. 10, 2022 issued in corresponding European Appln. No. 21204314.5.

(Continued)

*Primary Examiner* — Barbara D Reinier
(74) *Attorney, Agent, or Firm* — Harness, Dickey & Pierce, P.L.C.

(57) ABSTRACT

A color chart is for performing color adjustment on an image forming apparatus. The color chart includes identification information and a color adjustment patch. The identification information is on an image forming apparatus to which color adjustment is to be applied. The color adjustment patch includes a plurality of color patches for performing color adjustment on the image forming apparatus indicated by the identification information.

19 Claims, 16 Drawing Sheets

(56) References Cited

U.S. PATENT DOCUMENTS

| | | | |
|---|---|---|---|
| 2012/0086962 A1* | 4/2012 | Klassen | H04N 1/6041 358/1.9 |
| 2012/0133961 A1* | 5/2012 | Henderson | H04N 1/6033 358/1.9 |
| 2012/0147427 A1 | 6/2012 | Agehama | |
| 2014/0209682 A1 | 7/2014 | Gottwals et al. | |
| 2014/0375672 A1* | 12/2014 | Sakai | G09G 5/02 345/590 |
| 2016/0261775 A1 | 9/2016 | Jung et al. | |
| 2016/0274520 A1 | 9/2016 | Soma et al. | |
| 2016/0301830 A1 | 10/2016 | Shibata | |
| 2017/0078496 A1 | 3/2017 | Sugimoto et al. | |
| 2017/0085726 A1 | 3/2017 | Tominaga et al. | |
| 2017/0099414 A1 | 4/2017 | Yamaguchi | |
| 2017/0270655 A1 | 9/2017 | Watanabe et al. | |
| 2018/0259394 A1 | 9/2018 | Gotoh et al. | |
| 2018/0350059 A1 | 12/2018 | Watanabe et al. | |
| 2019/0147308 A1 | 5/2019 | Yamamoto | |
| 2019/0238724 A1 | 8/2019 | Fukase | |
| 2019/0250040 A1 | 8/2019 | Taneda et al. | |
| 2020/0018650 A1 | 1/2020 | Sone et al. | |
| 2020/0300701 A1 | 9/2020 | Taneda et al. | |

FOREIGN PATENT DOCUMENTS

| | | |
|---|---|---|
| JP | 2017-055282 A | 3/2017 |
| JP | 2019-138883 | 8/2019 |
| JP | 2020-153814 | 9/2020 |
| JP | 2020-153829 A | 9/2020 |
| JP | 2020153829 A * | 9/2020 |

OTHER PUBLICATIONS

Extended European Search Report dated Feb. 17, 2022 issued in corresponding European Appln. No. 21205092.6.

Office Action dated Jun. 23, 2022, issued in corresponding U.S. Appl. No. 17/504,872.

Office action dated Sep. 14, 2023, issued in corresponding U.S. Appl. No. 17/504,872.

* cited by examiner

COLOR CHART FOR PERFORMING COLOR AND IN-PLANE UNEVENNESS ON AN IMAGE FORMING APPARATUS

CROSS-REFERENCE TO RELATED APPLICATIONS

The present application claims priority under 35 U.S.C. § 119 to Japanese Patent Application No. 2020-181882, filed on Oct. 29, 2020. The contents of which are incorporated herein by reference in their entirety.

BACKGROUND OF THE INVENTION

1. Field of the Invention

The present invention relates to a color chart, an information processing apparatus, and an information processing system.

2. Description of the Related Art

In a printing company, it is necessary to maintain quality of printed materials. To maintain the quality of printed materials, it is necessary to print a predetermined color chart, read the predetermined color chart by using a color measuring device, such as a scanner, that reads colors, and perform color adjustment for each of printers depending on a difference from a quality target color. Therefore, if a plurality of printers are provided, it is necessary to prepare a chart including a color patch for color adjustment and perform the color adjustment for each of the printers.

As a technology for performing the color adjustment as described above, to evaluate color reproducibility and perform color adjustment by taking into account the influence of in-plane unevenness, a technology for performing measurement while taking into account the influence of the in-plane unevenness, and performing evaluation of color reproducibility and color adjustment based on a measurement result has been disclosed (for example, Japanese Unexamined Patent Application Publication No. 2007-181142).

However, the technology described in Japanese Unexamined Patent Application Publication No. 2007-181142 is based on the assumption that color adjustment is performed on a single printer, so that when color charts corresponding to a plurality of printers are output and a single color measurement apparatus (image reading apparatus) collectively measures colors and perform color adjustment, it is difficult to distinguish the printers that have output the color charts from one another, and it is difficult to effectively perform color adjustment, which is a problem.

SUMMARY OF THE INVENTION

According to an aspect of the present invention, a color chart is for performing color adjustment on an image forming apparatus. The color chart includes identification information and a color adjustment patch. The identification information is on an image forming apparatus to which color adjustment is to be applied. The color adjustment patch includes a plurality of color patches for performing color adjustment on the image forming apparatus indicated by the identification information.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
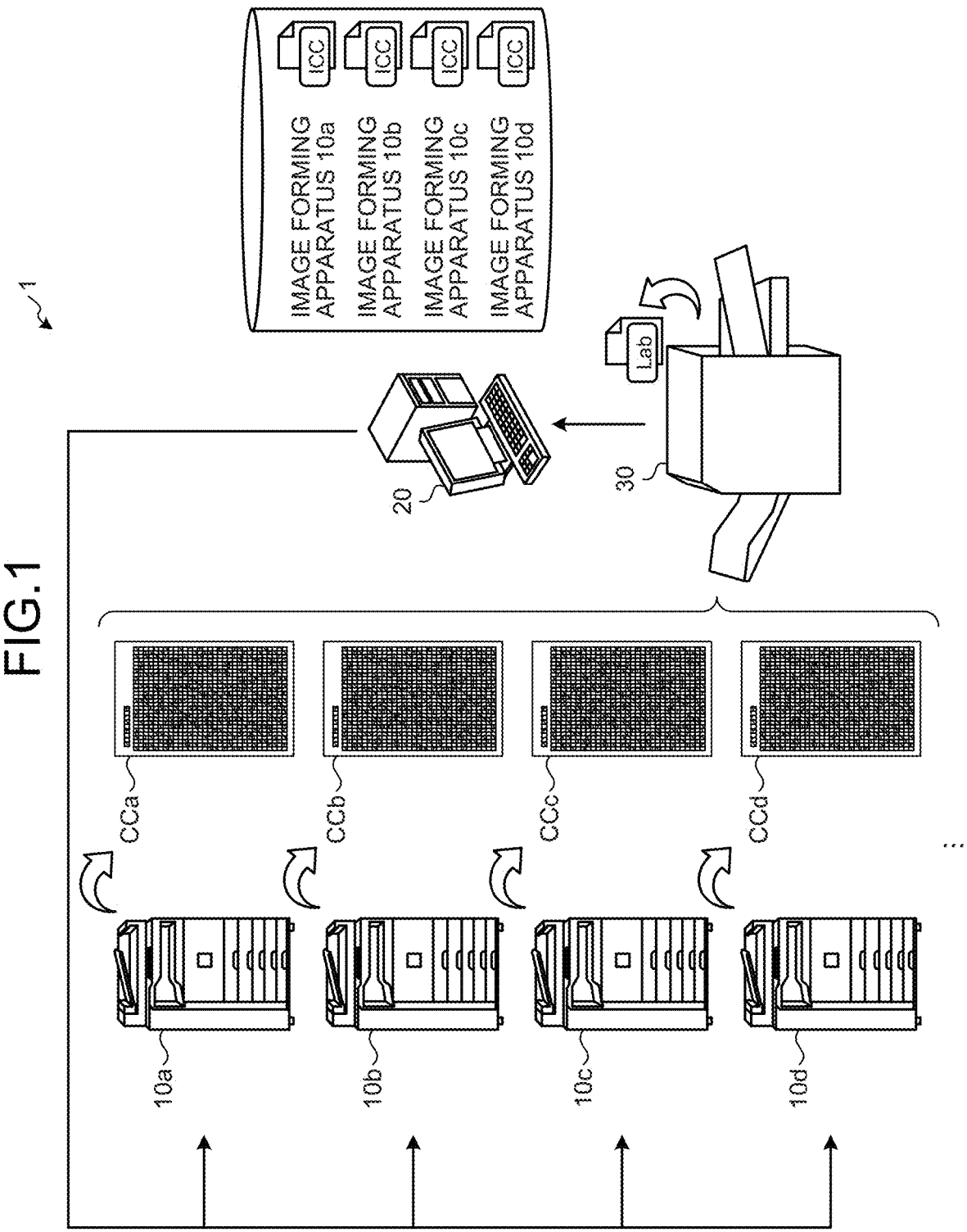
FIG. 1 is a diagram illustrating an example of an overall configuration of an image forming system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a color chart, an information processing apparatus, and an information processing system capable of effectively performing color adjustment by using a color chart by which an image forming apparatus that has performed output can be identified.

Embodiments of a color chart, an information processing apparatus, and an information processing system according to the present invention will be described in detail below with reference to the drawings. The present invention is not limited by the embodiments below, and structural elements in the embodiments below include one that can be easily thought of by a person skilled in the art, one that is practically identical, and one that is within an equivalent range. Furthermore, within the scope not departing from the gist of the embodiments below, various omission, replacement, modification, and combinations of the structural elements may be made.

First Embodiment

Overall Configuration of Image Forming System

FIG. 1 is a diagram illustrating an example of an overall configuration of an image forming system according to a first embodiment. The overall configuration of an image forming system 1 according to the present embodiment will be described below with reference to FIG. 1.

The image forming system 1 illustrated in FIG. 1 is an information processing system capable of effectively performing color adjustment on a plurality of image forming apparatuses by using color charts. As illustrated in FIG. 1, the image forming system 1 includes image forming apparatuses 10a to 10d, an information processing apparatus 20, and an image reading apparatus 30. All of the apparatuses included in the image forming system 1 are able to perform data communication with one another via a network (a network N illustrated in FIG. 4 to be described later).

The image forming apparatuses 10a to 10d are image forming apparatuses, such as multifunction peripherals (MFPs), as targets for a color adjustment process. Here, the MFP is a multifunction machine that has at least two of a copier function, a printer function, a scanner function, and a facsimile function. As illustrated in FIG. 1, the image forming apparatuses 10a to 10d receive pieces of image data of color charts (hereinafter, may be referred to as color chart data), which correspond to the respective image forming apparatuses and which are held by the information processing apparatus 20, and print out color charts CCa to CCd that are used for color adjustment on the basis of the respective pieces of color chart data. A detailed configuration of the color charts will be described later with reference to FIG. 5 and FIG. 6.

Meanwhile, in the example illustrated in FIG. 1, the four image forming apparatuses 10a to 10d are illustrated as the image forming apparatuses, but the number of the apparatuses is not specifically limited as long as at least two image forming apparatuses are included. Furthermore, the number of the image forming apparatuses included in the system may be one, but it is possible to improve efficiency of color adjustment operation by increasing the number of the image forming apparatuses. Moreover, when the plurality of image forming apparatuses (the image forming apparatuses 10a to 10d in FIG. 1) are referred to in a non-distinguishing manner or in a collective manner, they will be referred to as image forming apparatuses 10. Furthermore, similarly, when the color charts (the color charts CCa to CCd in FIG. 1) that are output from the respective image forming apparatuses 10 are referred to in a non-distinguishing manner or in a collective manner, they will be referred to as color charts CC. Moreover, each of the image forming apparatuses 10 is not limited to an MFP, and may be a normal printer of an electrophotographic type or an inkjet type that has a printer function as a main function, for example. Furthermore, each of the image forming apparatuses 10 may be a commercial printer or the like that is controlled to print processed print job data transmitted from a digital front end (DFE) that performs predetermined image processing on a print job data received from a personal computer (PC) or the like. In the present embodiment, explanation will be given based on the assumption that the image forming apparatuses 10 are MFPs.

The information processing apparatus 20 is an information processing apparatus, such as a PC or a workstation, that holds the color chart data to be printed out by each of the image forming apparatuses 10 and that transmits the color chart data to each of the image forming apparatuses 10 when the color adjustment process is performed on each of the image forming apparatuses 10. Furthermore, the information processing apparatus 20 performs the color adjustment process on each of the image forming apparatuses 10 by using image data that is obtained by causing the image reading apparatus 30 to perform a reading process on a color chart CC that is printed out by each of the image forming apparatuses 10. The information processing apparatus 20 generates an International Color Consortium (ICC) profile through the color adjustment process, and transmits the ICC profile to the image forming apparatus 10 that corresponds to an application destination to which the ICC profile is to be applied. Moreover, the image forming apparatus 10 performs printing by using the received ICC profile (hereinafter, simply referred to as a profile). The apparatus serving as the application destination may be a different apparatus, such as a DFE or a print server, in addition to the image forming apparatus 10.

The image reading apparatus 30 is an apparatus that performs the reading process on the color chart CC that is printed out by each of the image forming apparatuses 10, and generates color information data in which a read value is converted to a color measurement value, such as an L*a*b*value, an XYZ value, or an RGB value. The image reading apparatus 30 transmits the color information data including the generated color measurement value to the information processing apparatus 20. Meanwhile, the image reading apparatus 30 may be, for example, an image scanner, a certain device, such as a color measurement device, an inline sensor is arranged on a conveying path of a sheet inside the image forming apparatus 10, or the like, but is not specifically limited, and indicates general apparatuses capable of acquiring the color information data of the color chart CC. Furthermore, explanation will be given based on the assumption that the color measurement value that is converted from the read value by the image reading apparatus 30 is a L*a*b*value (hereinafter, simply referred to as a Lab value) of the L*a*b*color system. Moreover, the read value that is read by the image reading apparatus 30 need not always be converted to the color measurement value by the image reading apparatus 30, and it may be possible to cause the image reading apparatus 30 to transmit the read value as it is, as RAW data, to the information processing apparatus 20 and cause the information processing apparatus 20 to convert the RAW data to the color measurement value.

Hardware Configuration of Image Forming Apparatus

Figure 2:
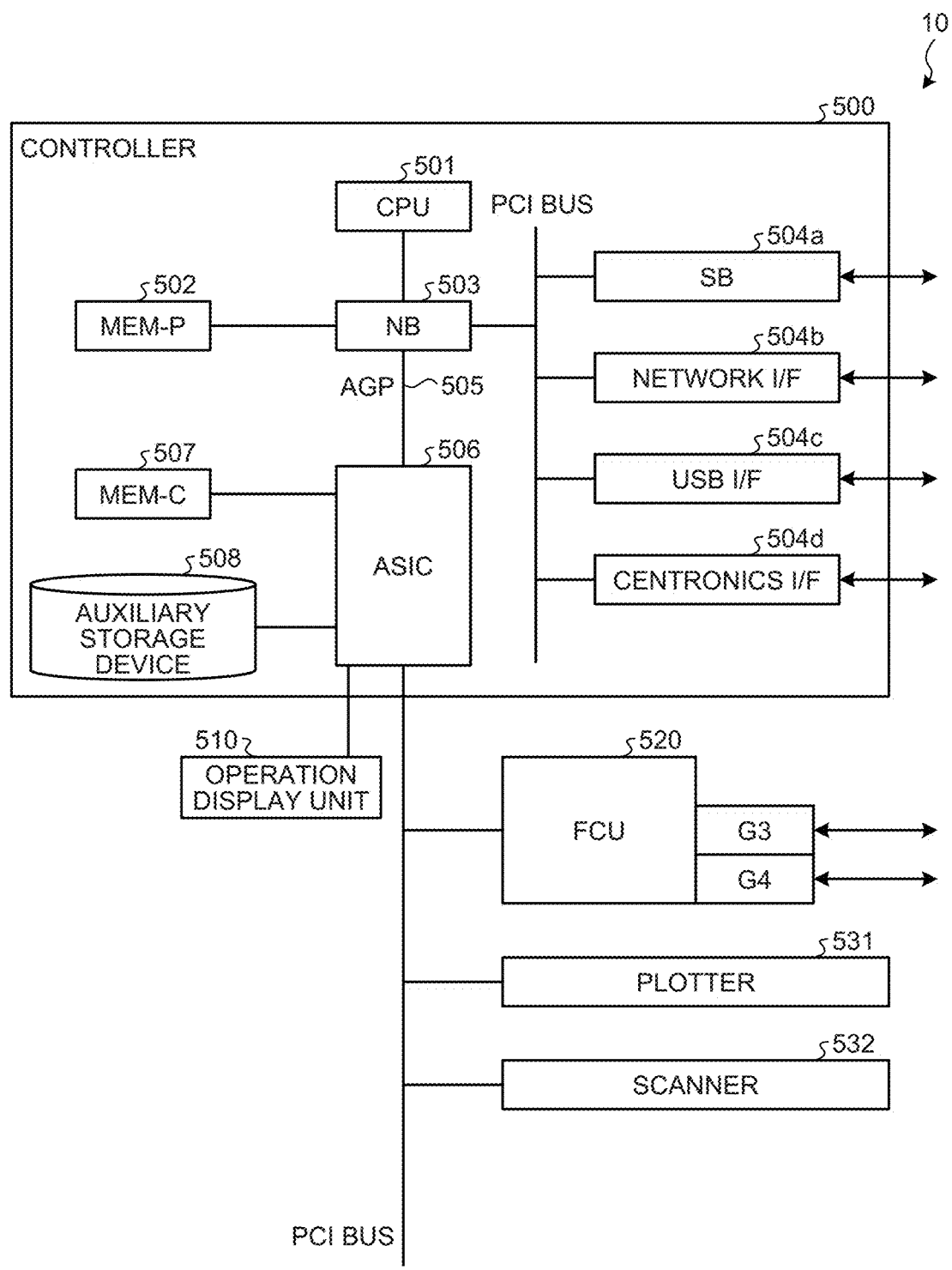
FIG. 2 is a diagram illustrating an example of a hardware configuration of an image forming apparatus according to the first embodiment.

FIG. 2 is a diagram illustrating an example of a hardware configuration of the image forming apparatus according to the first embodiment. The hardware configuration of the image forming apparatus 10 according to the present embodiment will be described with reference to FIG. 2.

As illustrated in FIG. 2, the image forming apparatus 10 according to the present embodiment includes a controller 500, an operation display unit 510, a facsimile control unit (FCU) 520, a plotter 531 (printing device), and a scanner 532, all of which are connected to one another via a peripheral component interface (PCI) bus.

The controller 500 is a device that controls the entire image forming apparatus 10, drawing, communication, and input from the operation display unit 510.

The operation display unit 510 is a device, such as a touch panel, that receives input to the controller 500 (input function), displays a state or the like of the image forming apparatus 10 (display function), and is directly connected to an application specific integrated circuit (ASIC) 506 to be described later.

The FCU 520 is a device that implements a facsimile function, and is connected to the ASIC 506 by the PCI bus, for example.

The plotter 531 is a device that implements a printing function to form an image on a recording medium, such as a sheet or a web, and perform printing, and is connected to the ASIC 506 by the PCI bus, for example. The scanner 532 is a function to implement a scanner function, and is connected to the ASIC 506 by the PCI bus, for example.

The controller 500 includes a central processing unit (CPU) 501, a system memory (MEM-P) 502, a north bridge (NB) 503, a south bridge (SB) 504a, a network interface (I/F) 504b, a universal serial bus (USB) I/F 504c, a Centronics I/F 504d, the ASIC 506, a local memory (MEM-C) 507, and an auxiliary storage device 508.

The CPU 501 controls the entire image forming apparatus 10, is connected to a chipset including the system memory 502, the north bridge 503, and the south bridge 504a, and is connected to other devices via the chipset.

The system memory 502 is a memory used as a memory for storing computer programs and data, a memory for loading computer programs and data, and a memory for use in picture drawing performed by a printer, and includes a read only memory (ROM) and a random access memory (RAM). The ROM is a read-only memory used as a memory for storing computer programs and data, and the RAM is a writable and readable memory used as a memory for loading computer programs and data and a memory for picture processing performed by a printer.

The north bridge 503 is a bridge for connecting the CPU 501, the system memory 502, the south bridge 504a, and an accelerated graphics port (AGP) bus 505 to one another, and includes a memory controller, a PCI master, and an AGP target for controlling read and write with respect to the system memory 502, for example.

The south bridge 504a is a bridge for connecting the north bridge 503, a PCI device, and a peripheral device to one another. The south bridge 504a is connected to the north bridge 503 via a PCI bus. Further, the network I/F 504b, the USB I/F 504c, the Centronics I/F 504d, and the like are connected to the PCI bus.

The network I/F 504b is an interface for performing data communication with an external apparatus, such as the information processing apparatus 20, by using the network N. For example, the network I/F 504b is compatible with Ethernet (registered trademark) and is able to perform communication compliant with Transmission Control Protocol (TCP)/Internet Protocol (IP) or the like.

The USB I/F 504c is an interface capable of performing communication with an apparatus compliant with the USB standard.

The Centronics I/F 504d is an interface that has specifications for a parallel port capable of transmitting a plurality of bits.

The AGP bus 505 is a bus interface for a graphics accelerator card introduced to speed up graphics operation. The AGP bus 505 is a bus that allows direct access to the system memory 502 with a high throughput, thereby speeding up the graphics accelerator card.

The ASIC 506 is an integrated circuit (IC) that includes a hardware element for image processing, is used for image processing, and has a function as a bridge to connect the AGP bus 505, the PCI bus, the auxiliary storage device 508, and the local memory 507 to one another. The ASIC 506 includes a PCI target and an AGP master; an arbiter (ARB) that is the central core of the ASIC 506; a memory controller that controls the local memory 507; a plurality of direct memory access controllers (DMACs) that rotate image data by using hardware logic; and a PCI unit that performs data transfer between the plotter 531 and the scanner 232 via the PCI bus. The FCU 520, the plotter 531, and the scanner 532 are connected to the ASIC 506 via the PCI bus, for example. Furthermore, the ASIC 506 is also connected to a host PC, a network, and the like (not illustrated).

The local memory 507 is a memory for use as a copy image buffer and a code buffer.

The auxiliary storage device 508 is a storage device, such as a hard disk drive (HDD), a solid state drive (SSD), a secure digital (SD) card, or a flash memory, and used for storing image data, storing programs, storing font data, and storing forms.

Meanwhile, the programs of the image forming apparatus 10 as described above may be distributed by being recorded in a computer readable recording medium (the auxiliary storage device 508 or the like) in a computer-installable or computer-executable file format.

Furthermore, the hardware configuration of the image forming apparatus 10 illustrated in FIG. 2 is one example; therefore, it is not necessary to include all of the structural devices, and it may be possible to include other structural devices.

Hardware Configuration of Information Processing Apparatus

Figure 3:
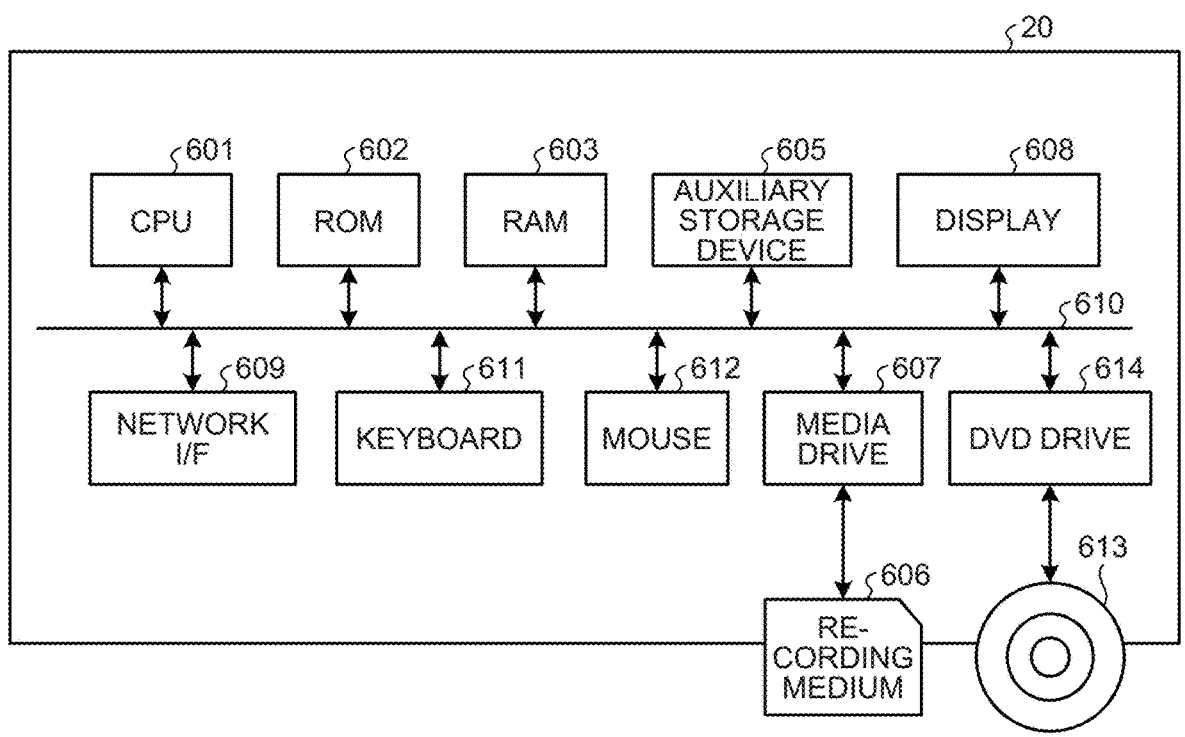
FIG. 3 is a diagram illustrating an example of a hardware configuration of an information processing apparatus according to the first embodiment.

FIG. 3 is a diagram illustrating an example of a hardware configuration of the information processing apparatus according to the first embodiment. The hardware configuration of the information processing apparatus 20 according to the present embodiment will be described with reference to FIG. 3.

As illustrated in FIG. 3, the information processing apparatus 20 includes a CPU 601, a ROM 602, a RAM 603, an auxiliary storage device 605, a media drive 607, a display 608 (display device), a network I/F 609, a keyboard 611, a mouse 612, and a digital versatile disc (DVD) drive 614.

The CPU 601 is an arithmetic device that controls the entire operation of the information processing apparatus 20. The ROM 602 is a non-volatile storage device that stores therein a program for the information processing apparatus 20. The RAM 603 is a volatile storage device used as a work area for the CPU 601.

The auxiliary storage device 605 is a storage device, such as an HDD or an SSD, used for storing various kinds of data and programs. The media drive 607 is a device that controls read and write of data with respect to the recording medium 606, such as a flash memory, under the control of the CPU 601.

The display 608 is a display device configured with liquid crystal, organic electro luminescence (EL), or the like for displaying various kinds of information, such as a cursor, a menu, a window, a character, or an image.

The network I/F 609 is an interface for performing data communication with an external apparatus, such as the image forming apparatus 10 and the image reading apparatus 30, by using the network N. The network I/F 609 is, for example, a network interface card (NIC) or the like that is compatible with Ethernet (registered trademark) and is able to perform communication compliant with TCP/IP or the like.

The keyboard 611 is an input device for selecting a character, a numeral, or various kinds of instructions, and moving the cursor, for example. The mouse 612 is an input device for selecting and executing various kinds of instructions, selecting a processing target, and moving a cursor, for example.

The DVD drive 614 is a device that controls read and write of data with respect to a DVD 613, such as a DVD-ROM or a DVD-recordable (DVD-R), as one example of a removable storage medium.

The CPU 601, the ROM 602, the RAM 603, the auxiliary storage device 605, the media drive 607, the display 608, the network I/F 609, the keyboard 611, the mouse 612, and the DVD drive 614 as described above are communicably connected to one another via a bus 610, such as an address bus or a data bus.

Meanwhile, the hardware configuration of the information processing apparatus 20 illustrated in FIG. 3 is one example; therefore, it is not necessary to include all of the structural devices, and it may be possible to include other structural devices.

Functional Block Configuration and Operation of Image Forming System

Figure 4:
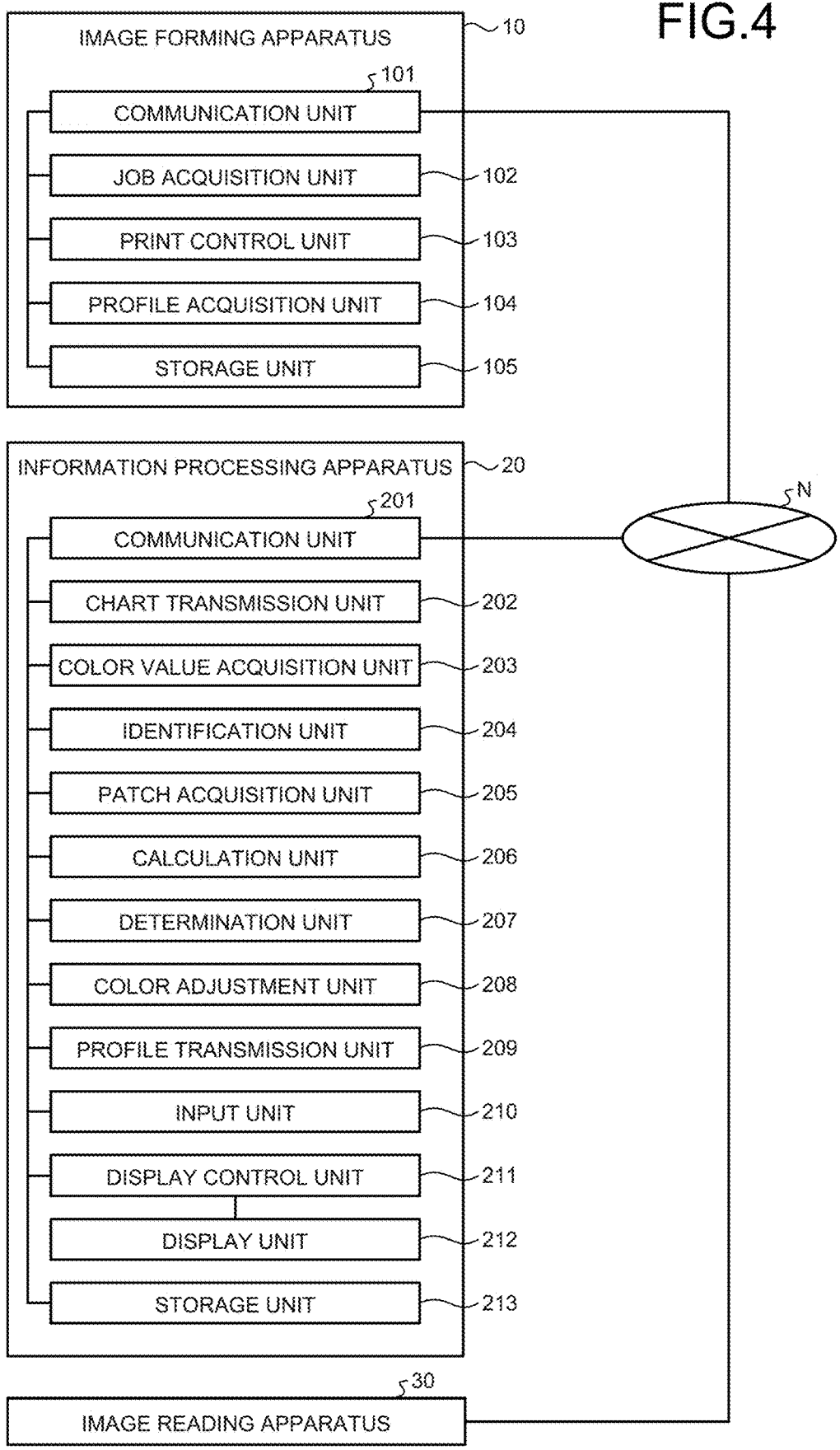
FIG. 4 is a diagram illustrating an example of a functional block configuration of the image forming system according to the first embodiment.
Figure 5:
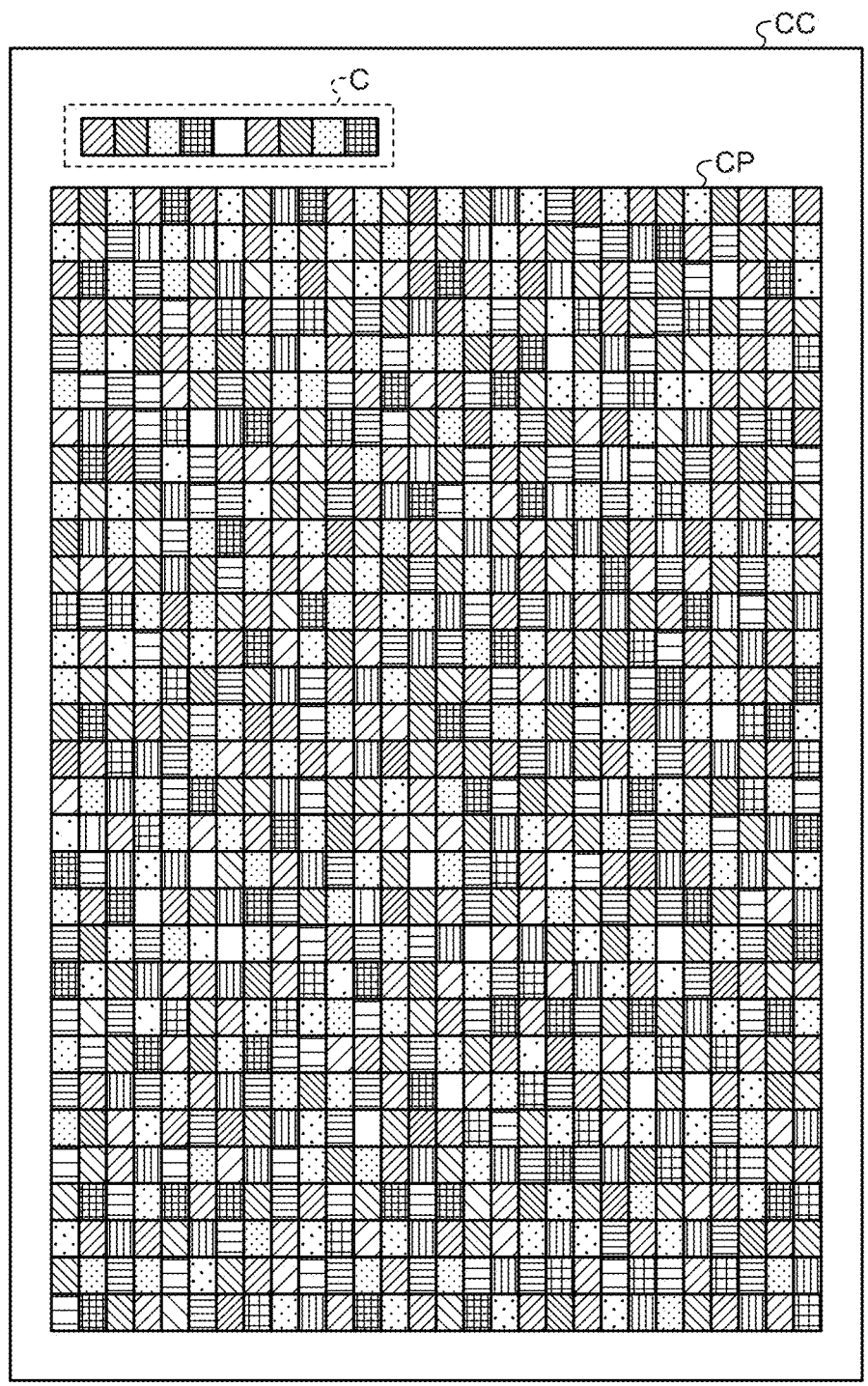
FIG. 5 is a diagram illustrating an example of a color chart.
Figure 6:
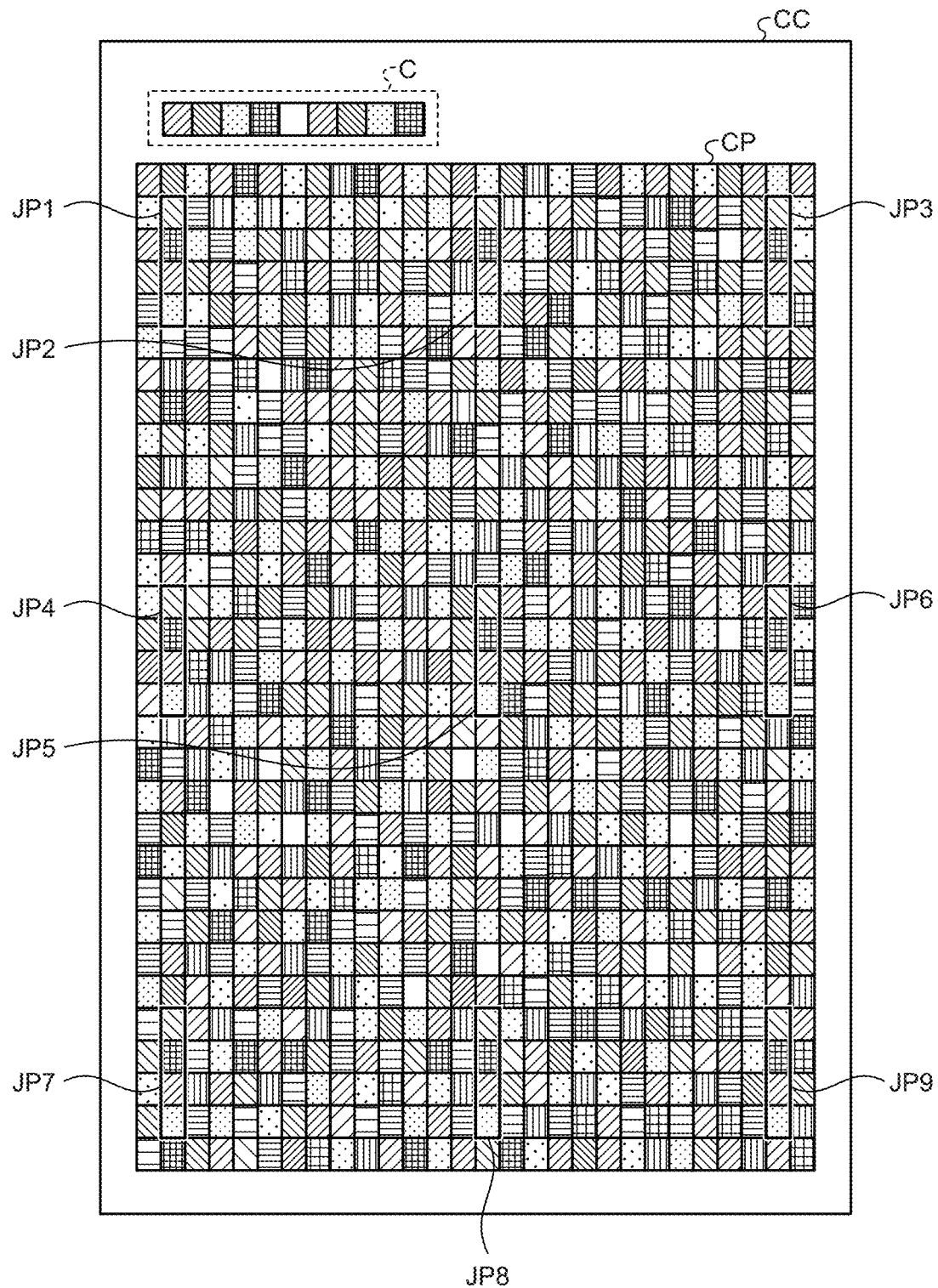
FIG. 6 is a diagram illustrating an example of determination patches included in the color chart.
Figure 7:
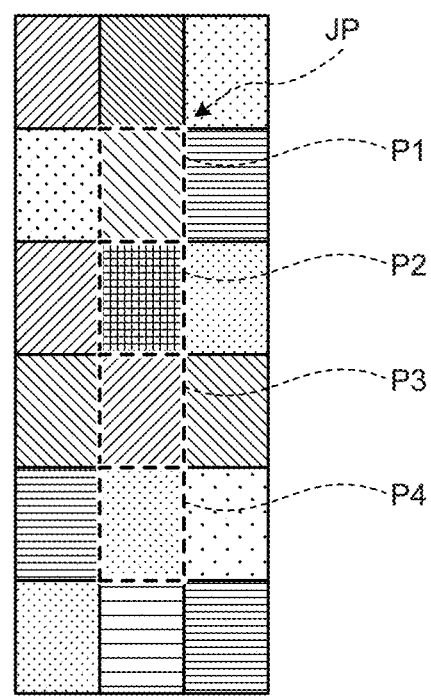
FIG. 7 is an enlarged view of the determination patch.

FIG. 4 is a diagram illustrating an example of a functional block configuration of the image forming system according to the first embodiment. FIG. 5 is a diagram illustrating an example of the color chart. FIG. 6 is a diagram illustrating an example of determination patches included in the color chart. FIG. 7 is an enlarged view of the determination patch. With reference to FIG. 4 to FIG. 7, the functional block configuration and operation of the image forming system 1 according to the present embodiment will be described.

As illustrated in FIG. 4, the image forming apparatus 10 includes a communication unit 101, a job acquisition unit 102, a print control unit 103, a profile acquisition unit 104, and a storage unit 105.

The communication unit 101 is a functional unit that performs data communication with the information processing apparatus 20 via the network N. The communication unit 101 is implemented by the network I/F 504b illustrated in FIG. 2 and by causing the CPU 501 illustrated in FIG. 2 to execute a program.

The job acquisition unit 102 is a functional unit that acquires a print job of the color chart data from the information processing apparatus 20. The job acquisition unit 102 is implemented by, for example, causing the CPU 501 illustrated in FIG. 2 to execute a program. Meanwhile, the job acquisition unit 102 may be one of functions of the DFE, and in this case, it may be possible to transmit the print job of the color chart data and print settings from the information processing apparatus 20 to the DFE, and allow a user to perform operation of causing the image forming apparatus 10 to execute the print job of the color chart data, on an operation screen or the like of the DFE at a desired printing timing.

The print control unit 103 is a functional unit that causes the plotter 531 to print out the color chart on the basis of the print job of the color chart data acquired by the job acquisition unit 102. Furthermore, when causing the color chart to be printed out, the print control unit 103 causes a color code including identification information on the image forming apparatus 10, identification information on a paper type, date and time of printing, and identification information on patch arrangement of the color chart to be printed out. The identification information on the patch arrangement of the color chart also serves as identification information for distinguishing the color chart, and therefore may be regarded as identification information on the color chart as a page. The print control unit 103 is implemented by, for example, causing the CPU 501 illustrated in FIG. 2 to execute a program.

Here, the color chart CC is illustrated in FIG. 5 as one example of the color chart that is printed out under the control of the print control unit 103. As illustrated in FIG. 5, the color chart CC includes a color code C and a color adjustment patch CP.

As described above, the color code C is a code in which the identification information on the image forming apparatus 10 that has printed out the color chart CC, the identification information on the paper type, the date and time of printing, and the identification information on arrangement of the color adjustment patch CP are coded as color patches. The color code C is configured with color patches of five colors, such as cyan (C), magenta (M), yellow (Y), black (K), and white (W). Color patches that indicate ends of the color code C and that identify an orientation of the color code C (an orientation of the arrangement of the color patch) are arranged at both ends of the color code C. Specifically, as illustrated in FIG. 5, two color patches arranged on the left end as one of the both ends are colored in cyan (C) and magenta (M) in this order from left, and two color patches arranged on the right end are colored in yellow (Y) and black (K) in this order from left, where the colors and the arrangement of the four color patches are fixed, so that it is possible to identify the orientation of the color code C by identifying the arrangement of the color patches. The information arranged on the left end or the right end of the color code C may be regarded as arrangement identification information for identifying the orientation, the arrangement, and the like of the color code C. The colors and the positions of the arrangement identification information may be determined by using a different method. Meanwhile, the color code C may include a color patch of a mixed color of C, M, Y, K, and W in addition to the single colors of C, M, Y, K, and W described above, and need not always be arranged in the above-described manner. Furthermore, the color code C may be configured with a color material of a different color, or may be configured with a less-visible color patch by using clear toner that is colorless and transparent or by using invisible red (IR) toner whose presence is recognized by infrared irradiation.

Moreover, the color patches arranged between the two color patches at one end of the color code C and the two color patches at the other end of the color code C specifically represent coded information (hereinafter, may be referred to as color code information). Each of the color patches included in the color code C is arranged so as not to have the same color as a color of an adjacent color patch. Furthermore, a numeral of 0 to 4 is assigned to each of the color patches included in the color code information, in accordance with the color of the color patch. Moreover, the number of digits of a numeral is determined by the number of the color patches included in the color code information, and the coded color code information can be represented by a numeral (decoded). Furthermore, the numeral converted from the color code information is formed of a numeral portion that is associated with setting information and a numeral portion that indicates date and time. With reference to the setting information corresponding to the numeral portion associated with the setting information (as will be described later, the setting information is stored in the information processing apparatus 20), it is possible to identify the image forming apparatus 10 (an apparatus type, an IP address, or the like), the paper type, and the patch arrangement of the color chart CC (the arrangement of the color adjustment patch CP) that are defined in the setting information. Moreover, it is possible to directly identify the date and time at which the color chart CC is printed out, by using the numeral portion indicating date and time. With this configuration, the information processing apparatus 20 is able to automatically identify the image forming apparatus 10 and the paper type as the application destination of the color adjustment process performed by the information processing apparatus 20.

Meanwhile, it is assumed that, in the color code C, the identification information on the image forming apparatus 10 that has printed out the color chart CC, the identification information on the paper type used for the printing, the date and time of printing, and the identification information on the arrangement of the color adjustment patch CP are coded, but embodiments are not limited to this example. For example, the color code C may further include identification information on print setting (density or the like) or the like. In this case, specifically, it is sufficient to include details of the print setting in the setting information corresponding to the numeral portion associated with the setting information, instead of directly including the identification information on the print setting in the color code information. Furthermore, if it is not necessary to manage the date and time of printing in the color code C, details indicating the date and time need not be included in the color code information.

The color adjustment patch CP is a group of color patches for use to perform, by the information processing apparatus 20, the color adjustment process on the image forming apparatus 10 that is identified by the color code C. The color adjustment patch CP as described above is affected by a printing state of the color chart CC on a sheet, where the printing state depends on a state of printing operation of the image forming apparatus 10, and unevenness may occur in a plane of the sheet. If the in-plane unevenness as described above occurs in the color adjustment patch CP, it becomes difficult to appropriately perform the color adjustment process on the image forming apparatus 10. To cope with this, as illustrated in FIG. 6, the color adjustment patch CP of the color chart CC according to the present embodiment includes determination patches JP1 to JP9 that are embedded at nine positions for evaluating in-plane unevenness of a sheet on which the color chart CC is printed. Furthermore, as illustrated in FIG. 6, the determination patches JP1 to JP9 are arranged at certain positions independently of each of the color patches included in the color adjustment patch CP. Moreover, the determination patches JP1 to JP9 are arranged over a wide area in the color adjustment patch CP as illustrated in FIG. 6.

Each of the determination patches JP1 to JP9 is a group of the same number of color patches with the same colors and in the same arrangement. In other words, as illustrated in FIG. 6, each of the determination patches JP1 to JP9 includes a plurality of color patches in the same arrangement. Meanwhile, if the determination patches JP1 to JP9 are referred to in a non-distinguishing manner or in a collective manner, they will be simply referred to as the determination patches JP. An enlarged view of one example of the determination patch JP is illustrated in FIG. 7. As illustrated in FIG. 7, to sensitively detect the in-plane unevenness, the determination patch JP includes a total of four kinds of color patches (gray patches), such as a monochrome halftone gray patch P1 of black (K) and halftone gray patches P2 to P4 of complex colors (mixed colors) that are obtained by adding cyan (C), magenta (M), and yellow (Y) at three different concentrations to black. The determination patches JP as described above are arranged, as the determination patches JP, at nine positions in the color adjustment patch CP as illustrated in FIG. 6 as described above. Meanwhile, the number, the color, and the arrangement of the color patches in each of the determination patches JP are not limited to those as described above, and, for example, the number of the color patches in each of the determination patches JP is not limited to 4. Furthermore, the arrangement positions of the determination patches JP are not limited to the nine positions, but may be the different number of positions.

Moreover, as illustrated in FIG. 7, neither a portion of white of paper or a white (W) color patch is arranged adjacent to the determination patch JP in order to avoid a situation in which color measurement is not appropriately performed due to flare caused by reflected light from white of paper. In other words, certain color patches rather than white of paper are arranged as color patches around the determination patch JP. The in-plane unevenness is evaluated by representing deviation of color values (color measurement values) measured from the determination patches JP1 to JP9 at the nine positions as a numeral as a color difference. An in-plane unevenness evaluation method (determination method) using the color difference of the color measurement values of the determination patches JP1 to JP9 will be described in detail later.

Referring back to FIG. 4, explanation of the functional blocks will be continued. The profile acquisition unit 104 is a functional unit that acquires, via the communication unit 101, the profile that is generated by the information processing apparatus 20 through the color adjustment process using the color measurement values (Lab values) of the color chart CC. The profile acquisition unit 104 stores the acquired profile in the storage unit 105. The profile stored in the storage unit 105 is applied when printing and output onto a sheet by the print control unit 103 is to be controlled. The profile acquisition unit 104 is implemented by, for example, causing the CPU 501 illustrated in FIG. 2 to execute a program. Meanwhile, the profile is generated and transmitted by the information processing apparatus 20 for each of the apparatus type and the paper type used by the apparatus type, where the apparatus type and the paper type are included in the color code, and is acquired, stored, and applied by the image forming apparatus 10 (or a DFE or the like). At this time, the single image forming apparatus 10 may store profiles for a plurality of paper types, and, every time a print job is performed, the image forming apparatus 10 may change a profile before execution of the print job and use the changed profile for each of print jobs for different paper types. For example, if the print job received by the image forming apparatus 10 includes information for designating a specific paper type mode or information for designating a specific sheet feed tray, a profile to be used (or a virtual printer associated with the paper type and the profile to be used) is changed in accordance with the information before execution of the print job. Furthermore, in this case, at the time of updating the profile, it may be possible to update and store only the profile for the paper type corresponding to the read color code every time the profile used for the specific paper type is transmitted to the single image forming apparatus 10, without updating the profiles for the other paper types. Moreover, the single image forming apparatus 10 may store only a single profile. In this case, if it is desired to perform printing using a different paper type, it may be possible to newly generate a profile corresponding to the different paper type and cause the image forming apparatus 10 to update the profile.

The storage unit 105 is a functional unit that stores therein the profile acquired by the profile acquisition unit 104, various kinds of data, programs, and the like. The storage unit 105 is implemented by the auxiliary storage device 508 illustrated in FIG. 2.

Meanwhile, at least a part of the functional units that are implemented by software among the functional units of the image forming apparatus 10 illustrated in FIG. 4 may be implemented by a hardware circuit, such as a field-programmable gate array (FPGA) or an ASIC.

Furthermore, each of the functional units of the image forming apparatus 10 illustrated in FIG. 4 is functionally conceptual, and configuration thereof is not limited to this example. For example, a plurality of functional units that are illustrated as independent functional units in the image forming apparatus 10 illustrated in FIG. 4 may be configured as a single functional unit. In contrast, a function of a single functional unit in the image forming apparatus 10 illustrated in FIG. 4 may be divided into a plurality of functions, and may be configured as a plurality of functional units. Moreover, any of the functions may be implemented by a DFE or a different apparatus.

As illustrated in FIG. 4, the information processing apparatus 20 includes a communication unit 201, a chart transmission unit 202, a color value acquisition unit 203 (acquisition unit), an identification unit 204, a patch acquisition unit 205, a calculation unit 206, a determination unit 207, a color adjustment unit 208, a profile transmission unit 209, an input unit 210, a display control unit 211, a display unit 212, and a storage unit 213. Meanwhile, the information processing apparatus 20 may be a terminal device, such as a PC or a smartphone, used by a user, or may be a cloud computing server device or a cloud computing system that provides functions as cloud computing services.

The communication unit 201 is a functional unit that performs data communication with the image forming apparatus 10 and the image reading apparatus 30 via the network N. The communication unit 201 is implemented by the network I/F 609 illustrated in FIG. 3 and by causing the CPU 601 illustrated in FIG. 3 to execute a program.

The chart transmission unit 202 is a functional unit that transmits the print job of the color chart data, which is used by the image forming apparatus 10 to print out the color chart, to the image forming apparatus 10 via the communication unit 201. The chart transmission unit 202 is implemented by, for example, causing the CPU 601 illustrated in FIG. 3 to execute a program.

The color value acquisition unit 203 is a functional unit that acquires, from the image reading apparatus 30 via the communication unit 201, color information data configured with the color measurement values (Lab values) of the respective color patches in the color chart CC that is obtained by the image reading apparatus 30 by performing the reading process on the color chart CC printed out by the image forming apparatus 10. The color value acquisition unit 203 is implemented by, for example, causing the CPU 601 illustrated in FIG. 3 to execute a program.

The identification unit 204 is a functional unit that identifies the color code information on the color code C from the color information data on the color chart CC acquired by the color value acquisition unit 203, represents the color code information by a numeral (decoding), and identifies the image forming apparatus 10 (apparatus type or the like), the paper type, the patch arrangement of the color chart CC (arrangement of the color adjustment patch CP), and the date and time of printing. The identification unit 204 is implemented by, for example, causing the CPU 601 illustrated in FIG. 3 to execute a program.

The patch acquisition unit 205 is a functional unit that identifies portions corresponding to the determination patches JP1 to JP9 at the nine positions arranged in the color adjustment patch CP from the color information data that is acquired by the color value acquisition unit 203, and acquires the color measurement values (Lab values) of the patches P1 to P4 in each of the determination patches JP1 to JP9. The patch acquisition unit 205 is implemented by, for example, causing the CPU 601 illustrated in FIG. 3 to execute a program.

The calculation unit 206 is a functional unit that calculates an average value or the like of the color measurement values for each of the patches P1 to P4 in the determination patches JP1 to JP9 acquired by the patch acquisition unit 205. Specifically, assuming that the color measurement values (Lab values) of the patches P1 in the determination patches JP1 to JP9 are represented by (L*1_1, a*1_1, b*1_1), (L*1_2, a*1_2, b*1_2), . . . , (L*1_9, a*1_9, b*1_9), the calculation unit 206 first calculates an average color measurement value (L*1_ave, a*1_ave, b*1_ave) that is an average value of the color measurement values of the patches P1 by using Expression (1) below.

$$L^*1\_ave = \frac{1}{9}\sum_{i=1}^{9} L^*1\_i, \quad a^*1\_ave = \frac{1}{9}\sum_{i=1}^{9} a^*1\_i, \quad (1)$$

$$b^*1\_ave = \frac{1}{9}\sum_{i=1}^{9} b^*1\_iv$$

Subsequently, the calculation unit 206 calculates, as ΔE1_1 to ΔE1_9, color differences between the color measurement values (Lab values) (L*1_1, a*1_1, b*1_1) to (L*1_9, a*1_9, b*1_9) of the patches P1 in the determination patches JP1 to JP9 and the calculated average color measurement value (L*1_ave, a*1_ave, b*1_ave). Meanwhile, as a formula for calculating the color difference, it may be possible to use ΔE2000 that is compatible with human sense, or it may be possible to use ΔE76, ΔE94, or the like for which calculations are simpler, for example. Then, the calculation unit 206 calculates a maximum value ΔE1_Max among the calculated color differences ΔE1_1 to ΔE1_9. Similarly, the calculation unit 206 calculates maximum values ΔE2 Max to ΔE4_Max by using the color measurement values (Lab values) of the patches P2 to P4 in the determination patches JP1 to JP9.

The calculation unit 206 is implemented by, for example, causing the CPU 601 illustrated in FIG. 3 to execute a program.

The determination unit 207 is a functional unit that determines whether the maximum values ΔE1_Max to ΔE4_Max, which are calculated by the calculation unit 206, are equal to or larger than predetermined thresholds Thresh by Expressions (2) below.

$$\begin{cases} \Delta E1\_Max \geq Thresh \\ \Delta E2\_Max \geq Thresh \\ \Delta E3\_Max \geq Thresh \\ \Delta E4\_Max \geq Thresh \end{cases} \quad (2)$$

If at least one of Expressions (2) is satisfied, the determination unit 207 determines that unevenness is present in the color adjustment patch CP included in the color chart CC, and determines that an abnormality is present in the state of the image forming apparatus 10 identified by the identification unit 204. Meanwhile, in Expressions (2), the thresholds Thresh for the maximum values $\Delta E1\_Max$ to $\Delta E4\_Max$ need not always be the same value, but at least any of the thresholds may be set to a different value. The determination unit 207 is implemented by, for example, causing the CPU 601 illustrated in FIG. 3 to execute a program.

The color adjustment unit 208 is a functional unit that, if the determination unit 207 determines that no abnormality is present in the state of the image forming apparatus 10 identified by the identification unit 204, performs the color adjustment process by using the color measurement values of all of the color patches corresponding to the color adjustment patch CP in the color information data of the color chart CC. Specifically, because the color values of the color patches in the color chart data of the color chart CC are already known, the color adjustment unit 208 generates a profile by performing a color adjustment process of a well-known technology such that the color measurement values of the patches corresponding to the color adjustment patch CP reproduce the known color values. The color adjustment unit 208 is implemented by, for example, causing the CPU 601 illustrated in FIG. 3 to execute a program.

The profile transmission unit 209 is a functional unit that transmits the profile generated by the color adjustment unit 208 to the image forming apparatus 10 identified by the identification unit 204 via the communication unit 201. The profile transmission unit 209 is implemented by, for example, causing the CPU 601 illustrated in FIG. 3 to execute a program.

The input unit 210 is a functional unit that receives input of operation from a user. The input unit 210 is implemented by the keyboard 611 and the mouse 612 illustrated in FIG. 3.

The display control unit 211 is a functional unit that controls display of various screens and various kinds of information on the display unit 212. The display control unit 211 is implemented by, for example, causing the CPU 601 illustrated in FIG. 3 to execute a program.

The display unit 212 is a functional unit that performs operation of displaying various screens and various kinds of information under the control of the display control unit 211. The display unit 212 is implemented by the display 608 illustrated in FIG. 3.

The storage unit 213 is a functional unit that stores therein the color chart data, the profile generated by the color adjustment unit 208, and the like. The storage unit 213 is implemented by the auxiliary storage device 605 illustrated in FIG. 3.

Meanwhile, at least a part of the functional units that are implemented by software among the functional units of the information processing apparatus 20 illustrated in FIG. 4 may be implemented by a hardware circuit, such as an FPGA or an ASIC.

Furthermore, each of the functional units of the information processing apparatus 20 illustrated in FIG. 4 is functionally conceptual, and configuration thereof is not limited to this example. For example, a plurality of functional units that are illustrated as independent functional units in the information processing apparatus 20 illustrated in FIG. 4 may be configured as a single functional unit. In contrast, a function of a single functional unit in the information processing apparatus 20 illustrated in FIG. 4 may be divided into a plurality of functions, and may be configured as a plurality of functional units.

Flow of Color Adjustment Process

Figure 8:
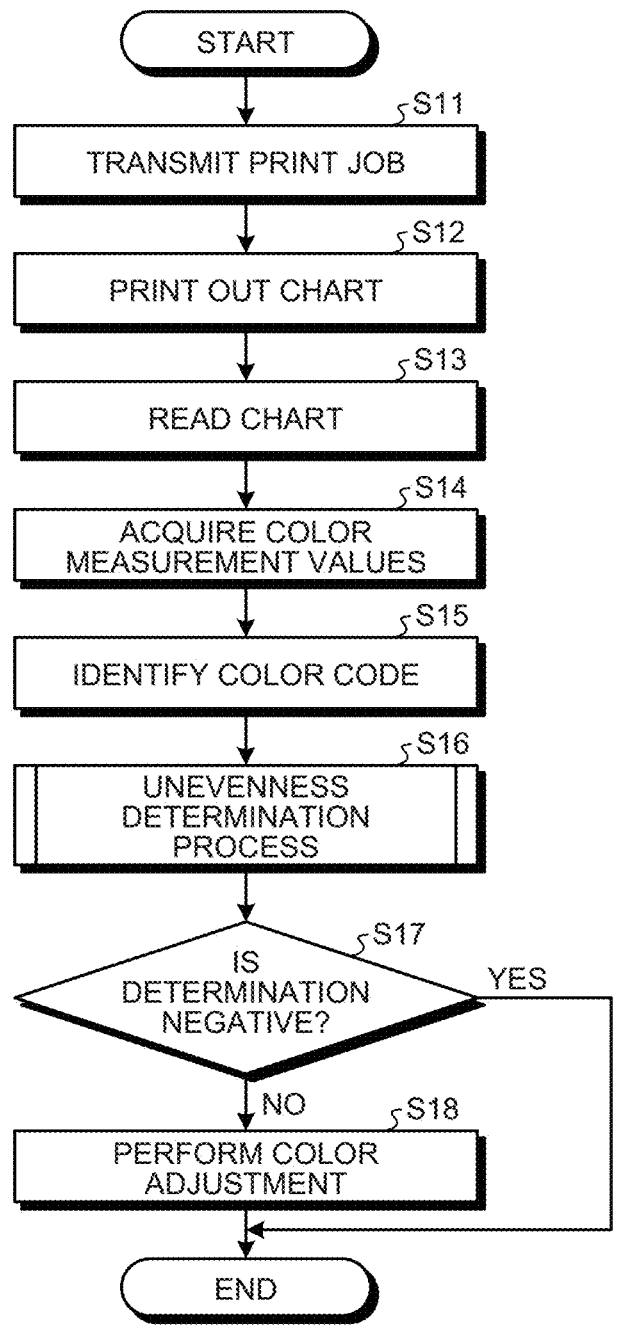
FIG. 8 is a flowchart illustrating an example of the flow of a color adjustment process performed by the image forming system according to the first embodiment.
Figure 9:
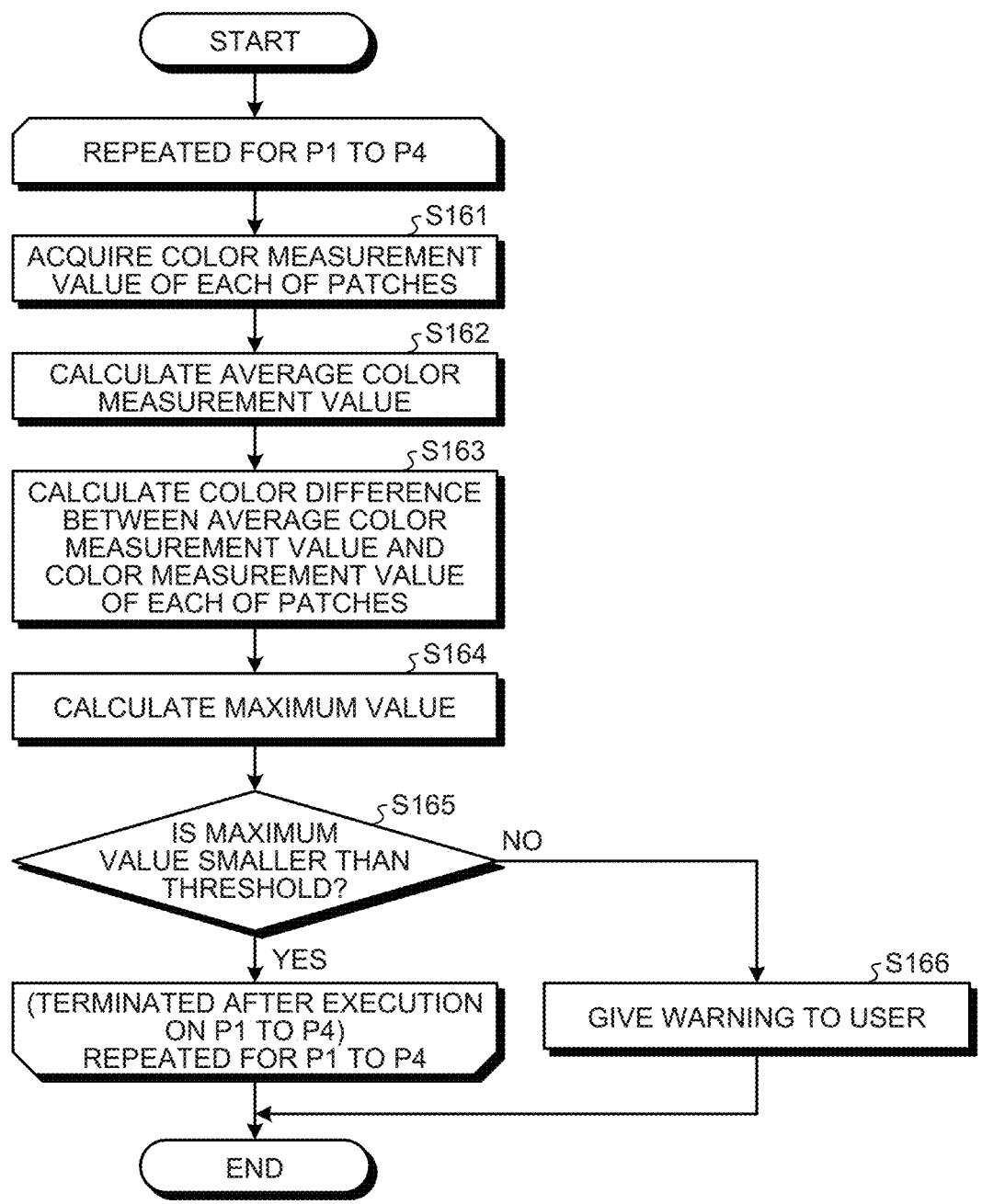
FIG. 9 is a flowchart illustrating an example of the flow of an unevenness determination process performed by the information processing apparatus according to the first embodiment.
Figure 10:
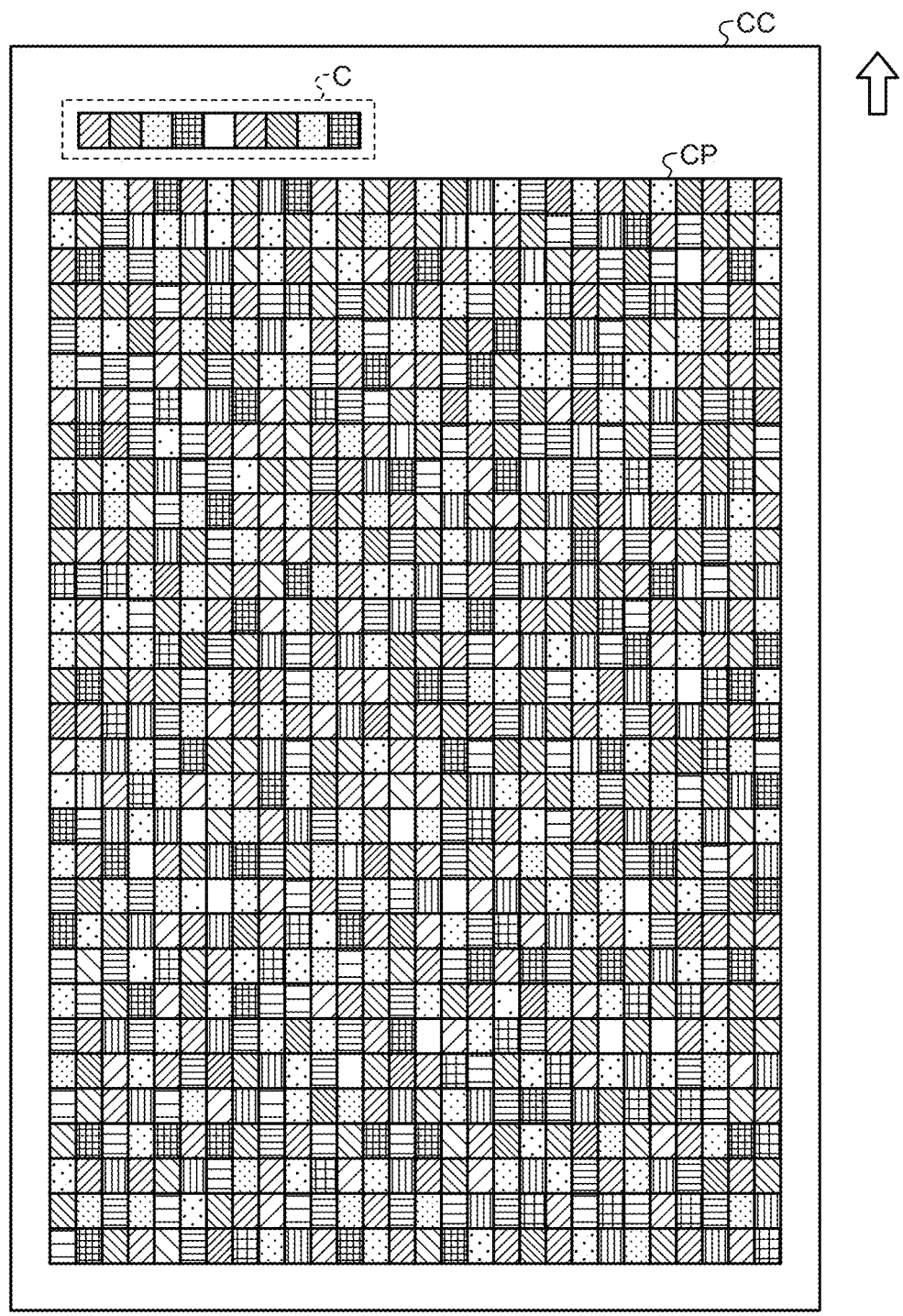
FIG. 10 is a diagram illustrating an example of a color chart reading direction.
Figure 11:
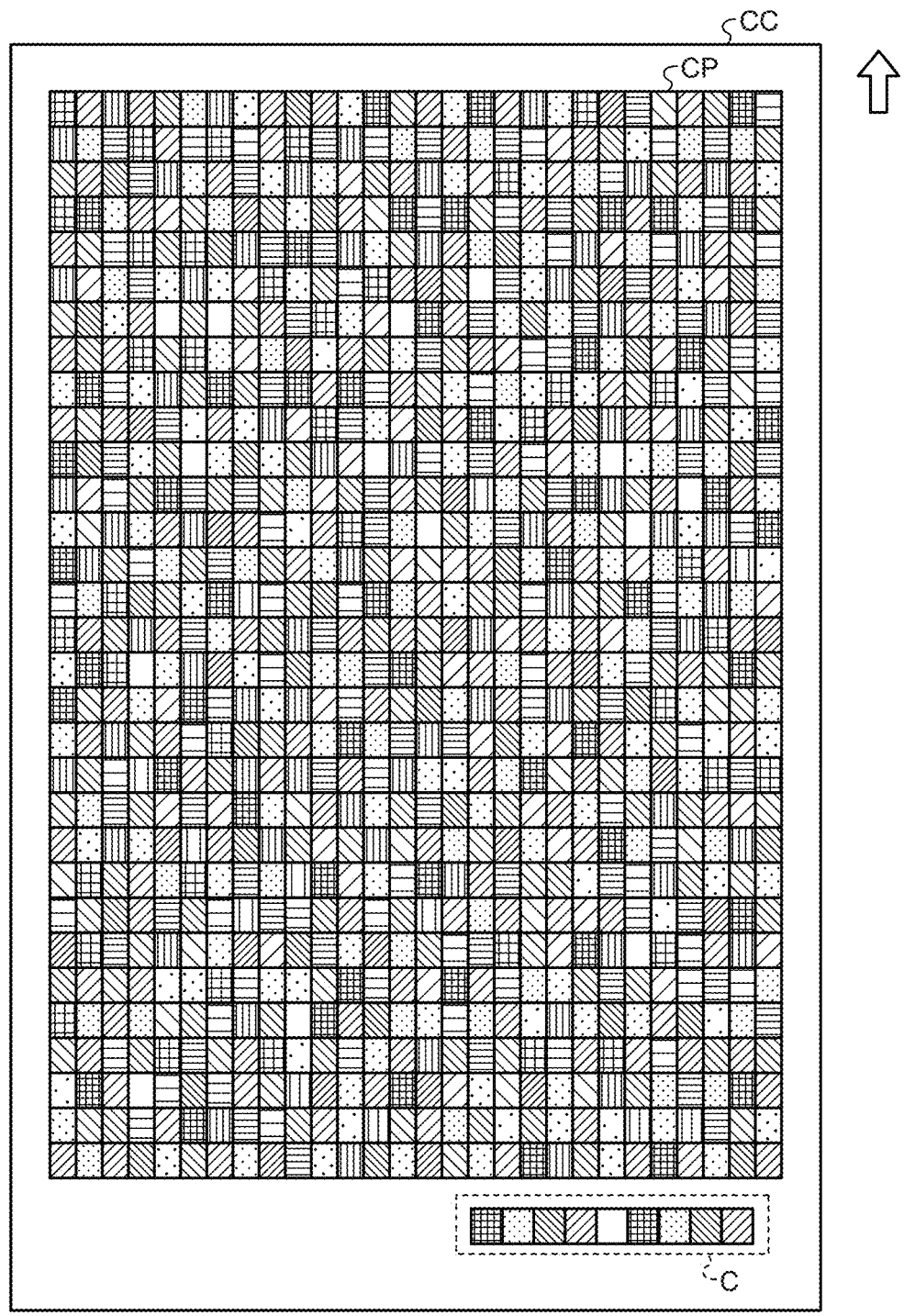
FIG. 11 is a diagram illustrating another example of the color chart reading direction.
Figure 12:
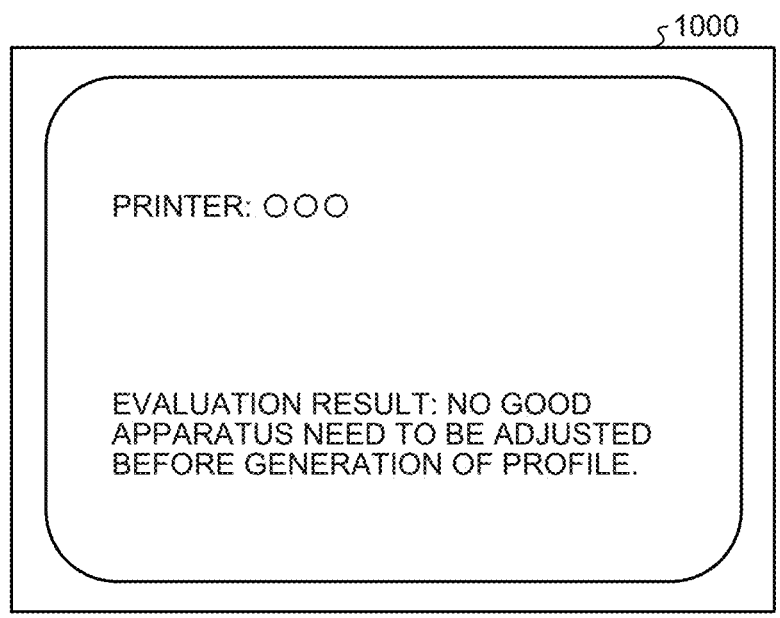
FIG. 12 is a diagram illustrating an example of an unevenness determination abnormality screen.

FIG. 8 is a flowchart illustrating an example of the flow of the color adjustment process performed by the image forming system according to the first embodiment. FIG. 9 is a flowchart illustrating an example of the flow of an unevenness determination process performed by the information processing apparatus according to the first embodiment. FIG. 10 is a diagram illustrating an example of a color chart reading direction. FIG. 11 is a diagram illustrating another example of the color chart reading direction. FIG. 12 is a diagram illustrating an example of an unevenness determination abnormality screen. The flow of the color adjustment process performed by the image forming system 1 will be described below with reference to FIG. 8 to FIG. 12.

<Step S11>

First, the chart transmission unit 202 of the information processing apparatus 20 transmits the print job of the color chart data, which is used by the image forming apparatus 10 as a target for the color adjustment process to print out the color chart, to the image forming apparatus 10 via the communication unit 201. In this case, the chart transmission unit 202 may transmit the print job of the color chart data to the plurality of image forming apparatuses 10. Then, the process proceeds to Step S12.

<Step S12>

The job acquisition unit 102 of the image forming apparatus 10 acquires the print job of the color chart data from the information processing apparatus 20. Further, the print control unit 103 of the image forming apparatus 10 causes the plotter 531 to print out the color chart based on the print job of the color chart data acquired by the job acquisition unit 102. In this case, when causing the color chart CC to be printed out, the print control unit 103 causes the color code including the identification information on the image forming apparatus 10, the identification information on the paper type, the date and time of printing, and the identification information on the patch arrangement of the color chart CC to be printed. The color chart CC is configured as described above. Then, the process proceeds to Step S13.

<Step S13>

The image reading apparatus 30 performs the reading process on the color chart CC that is printed out by the image forming apparatus 10, and generates color information data in which the read values on the entire surface of the color chart CC are converted to the color measurement values (Lab values). The image reading apparatus 30 transmits the generated color information data to the information processing apparatus 20. Then, the process proceeds to Step S14. Meanwhile, the image reading apparatus 30 may be able to collectively place and sequentially read the plurality of color charts CC, in each of which the color code including the identification information on the different image forming apparatus 10, the identification information on the paper type, and the like are printed, and transmit the pieces of acquired color information data to the information processing apparatus 20 sequentially or collectively.

<Step S14>

The color value acquisition unit 203 of the information processing apparatus 20 acquires the color information data corresponding to the color chart CC that is printed out by the image forming apparatus 10, from the image reading apparatus 30 via the communication unit 201. Then, the process proceeds to Step S15.

<Step S15>

The identification unit 204 of the information processing apparatus 20 performs scanning from a leading end of the color information data in order to identify the color code C from the color information data on the color chart CC acquired by the color value acquisition unit 203, and searches for the color patches on both ends of the color code C. In general, it is assumed that reading is performed in a direction of arrow in FIG. 10 as a reading direction of the color information data; however, if reading is performed while reversing the chart reading direction as illustrated in FIG. 11, the color code C is detected in a horizontally-inverted orientation as compared to the orientation read in FIG. 10. To accurately recognize the color code C even in this case, determination is performed based on whether the colors at the ends of the color code C correspond to the color patches of the predetermined colors as described above. Meanwhile, even if the color chart CC that is arranged upside down is included when the plurality of color charts CC are collectively placed, it is possible to accurately recognize the color codes C.

Specifically, if a search is performed in the orientation illustrated in FIG. 10, the identification unit 204 recognizes that the two color patches arranged on the left end as one of the both ends of the color code C are colored in cyan (C) and magenta (M) in this order from left, and recognizes that the two color patches arranged on the right end are colored in yellow (Y) and black (K) in this order from left, thereby identifying the color code information on the color chart CC. In contrast, if a search is performed in the orientation illustrated in FIG. 11, the identification unit 204 recognizes that the two color patches arranged on the left end as one of the both ends of the color code C are colored in black (K) and yellow (Y) in this order from left, and recognizes that the two color patches arranged on the right end are colored in magenta (M) and cyan (C) in this order from left, thereby recognizing that the arrangement is inverted as compared to the arrangement in FIG. 10. In this case, the identification unit 204 adds a process of rotating, by 180 degrees, the color information data on the entire surface of the color chart CC that is obtained by performing reading in the reading direction illustrated in FIG. 11, in order to conform to the arrangement obtained in the reading direction illustrated in FIG. 10. Then, by adding the process as described above, the identification unit 204 is able to appropriately perform a process on the color information data on the color chart CC that is read in a different direction, and identify the color code information on the color chart CC.

Further, the identification unit 204 represents the identified color code information by a numeral (decoding), and identifies the image forming apparatus 10 (apparatus type or the like), the paper type, the patch arrangement of the color chart CC (arrangement of the color adjustment patch CP), and the date and time of printing. Then, the process proceeds to Step S16.

<Step S16>

Subsequently, the information processing apparatus 20 performs the unevenness determination process on the color chart CC through Steps S161 to S167 illustrated in FIG. 9. The unevenness determination process will be described below.

<<Step S161>>

The patch acquisition unit 205 of the information processing apparatus 20 identifies portions corresponding to the determination patches JP1 to JP9 that are embedded at the nine positions in the color adjustment patch CP from the color information data that is acquired by the color value acquisition unit 203, and acquires the color measurement value (Lab value) of the patch P1 in each of the determination patches JP1 to JP9. Then, the process proceeds to Step S162.

<<Step S162>>

The calculation unit 206 of the information processing apparatus 20 calculates the average color measurement value (L*1_ave, a*1_ave, b*1_ave) that is an average value of the color measurement values of the patches P1 in the determination patches JP1 to JP9 acquired by the patch acquisition unit 205, by Expression (1) above. Then, the process proceeds to Step S163.

<<Step S163>>

Subsequently, the calculation unit 206 calculates, as ΔE1_1 to ΔE1_9, the color differences between the color measurement values (Lab values) (L*1_1, a*1_1, b*1_1) to (L*1_9, a*1_9, b*1_9) of the patches P1 in the determination patches JP1 to JP9 and the calculated average color measurement value (L*1_ave, a*1_ave, b*1_ave). Then, the process proceeds to Step S164.

<<Step S164>>

The calculation unit 206 calculates the maximum value ΔE1_Max among the calculated color differences ΔE1_1 to ΔE1_9. Then, the process proceeds to Step S165.

<<Step S165>>

The determination unit 207 of the information processing apparatus 20 determines whether the maximum value ΔE1_Max calculated by the calculation unit 206 is equal to or larger than the predetermined threshold by Expression (2) above. If the maximum value ΔE1_Max is smaller than the threshold Thresh (Yes at Step S165), and if any of the patches P2 to P4 is not subjected to the process, the process returns to Step S161, the processes from Steps S161 to S166 are repeated, and, if all of the patches P2 to P4 are subjected to the process, the unevenness determination process is terminated and the process proceeds to Step S17 in FIG. 8. In contrast, if the maximum value ΔE1_Max is equal to or larger than the threshold Thresh (NO at Step S165), the process proceeds to Step S166.

<<Step S166>>

If it is determined that the maximum value ΔE1_Max is equal to or larger than the threshold Thresh, the determination unit 207 determines that in-plane unevenness is present in the color adjustment patch CP included in the color chart CC, and determines that the state of the image forming apparatus 10 identified by the identification unit 204 is abnormal. In this case, the display control unit 211 of the information processing apparatus 20 causes the display unit 212 to display an unevenness determination abnormality screen 1000 indicating that the in-plane unevenness is present in the color adjustment patch CP as illustrated in FIG. 12 to thereby give a warning to a user. In this case, as illustrated in FIG. 12, the display control unit 211 causes the unevenness determination abnormality screen 1000 to display the identification information (the apparatus type, the IP address, or the like) on the image forming apparatus 10 that is identified by the color code C of the color chart CC for which it is determined that the in-plane unevenness is present. Meanwhile, the display control unit 211 may cause the unevenness determination abnormality screen 1000 to display at least any of the paper type, the date and time, and page information, which are identified by the color code, in addition to the identification information on the image forming apparatus 10. Then, the unevenness determination process is terminated, and the process proceeds to Step S17.

<Step S17>

In the unevenness determination process, if the determination unit 207 determines that no in-plane unevenness is present in the color adjustment patch CP included in the color chart CC (NO at Step S17), the process proceeds to Step S18, and, if it is determined that the in-plane unevenness is present (determines as NG) (YES at Step S17), the color adjustment process is terminated.

<Step S18>

The color adjustment unit 208 of the information processing apparatus 20 performs the color adjustment process by using the color measurement values of all of the patches corresponding to the color adjustment patch CP in the color information data of the color chart CC. Specifically, because the color values of the color patches in the color chart data of the color chart CC are already known, the color adjustment unit 208 generates a profile by performing a color adjustment process of a well-known technology such that the color measurement values of the patches corresponding to the color adjustment patch CP reproduces the known color values. Then, the profile transmission unit 209 of the information processing apparatus 20 transmits the profile generated by the color adjustment unit 208 to the image forming apparatus 10 identified by the identification unit 204 via the communication unit 201. Meanwhile, if the plurality of color charts CC, in each of which the color code including the identification information on the different image forming apparatus 10, the identification information on the paper type, and the like are printed, are collectively read, a plurality of profiles to be applied to the plurality of image forming apparatuses 10 and the plurality of paper types are generated, the profiles are stored in the information processing apparatus 20 for each of the image forming apparatuses 10 and the paper types by using the identification information, and the profiles are transmitted to the respective image forming apparatuses 10 by using the identification information.

Then, the profile acquisition unit 104 of the image forming apparatus 10 acquires the profile generated by the information processing apparatus 20 via the communication unit 101. The profile acquisition unit 104 stores the acquired profile in the storage unit 105. The profile stored in the storage unit 105 is applied when the print control unit 103 controls printing on a sheet. Then, the color adjustment process is terminated.

As described above, in the image forming system 1 according to the present embodiment, the color chart CC that is printed out by the image forming apparatus 10 includes the color adjustment patch CP used for the color adjustment process and the color code C including at least the identification information on the image forming apparatus 10. Further, the information processing apparatus 20 identifies the color code C from the color information data of the color chart CC read by the image reading apparatus 30, and identifies the image forming apparatus 10 on the basis of the identification information on the image forming apparatus 10 included in the color code C. With this configuration, when the plurality of image forming apparatuses 10 output the color charts CC, it is possible to determine the image forming apparatuses 10 that have output the respective color charts by identifying the image forming apparatuses 10 by the color codes C included in the color charts CC, so that it is possible to automatically generate profiles for the determined image forming apparatuses without operation by a user, and it is possible to effectively perform color adjustment.

Furthermore, the color code C of the color chart CC further includes the identification information on the paper type of the sheet on which the color chart CC is output, in addition to the identification information on the image forming apparatus 10. If the paper type to be used is changed, a problem may occur in that a printing quality level as desired by a user is not achieved because a profile does not match a profile that is prepared in advance; however, as described above, in the present embodiment, the color chart CC includes the identification information on the paper type in addition to the identification information on the image forming apparatus 10, so that it is possible to generate the profile by adopting the image forming apparatus 10 and the paper type as the application destinations, and it is possible to perform color adjustment corresponding to each of the paper types.

Moreover, the color adjustment patch CP of the color chart CC includes the plurality of determination patches that are embedded to evaluate the in-plane unevenness on the sheet on which the color chart CC is printed. In the conventional technology, if the state of the image forming apparatus 10 is not appropriate, a color adjustment process may be performed; however, with use of the plurality of determination patches as described above, it is possible to evaluate (determine) the in-plane unevenness of the printed color chart CC. With this configuration, it is possible to prevent a situation in which the color adjustment process is performed while the state of the image forming apparatus 10 is not appropriate, so that it is possible to reduce unnecessary operation and reduce time of the color adjustment process.

Meanwhile, in the color chart CC according to the present embodiment, the color code includes the identification information on the image forming apparatus 10, the identification information on the paper type, the date and time of printing, and the identification information on the patch arrangement of the color chart CC, but embodiments are not limited to this example. For example, it may be possible to include the information as described above in a barcode, a two-dimensional code, or the like, and print out the code on the color chart CC together with the color adjustment patch CP.

Second Embodiment

An image forming system 1 according to a second embodiment will be described below, mainly in terms of a difference from the image forming system 1 according to the first embodiment. In the first embodiment, the operation has been explained in which the information processing apparatus 20 performs the unevenness determination process by using the single color chart CC that is printed out by the image forming apparatus 10. In the present embodiment, operation will be described in which at least the single image forming apparatus 10 performs the unevenness determination process by using a plurality of color charts. Meanwhile, hardware configurations of the image forming apparatus 10 and the information processing apparatus 20 according to the present embodiment and a functional block configuration of the image forming system 1 are the same as those described in the first embodiment. The unevenness determination process using the plurality of color charts according to the present embodiment is advantageous in that, in an image forming apparatus capable of forming images on a plurality of sheets in one cycle of image forming operation, it is possible to check whether unevenness is present in the enter image forming means (the plotter 531 or the like). The one cycle of the image forming operation indicates, for example, one rotation of a transfer means for transferring an image onto a sheet or one rotation of a conveying means for conveying a sheet at the time of image formation. By determining, as color unevenness between a plurality of sheets, whether the color unevenness causes a problem in the entire image forming means capable of performing printing on a plurality of sheets in one cycle, it is possible to confirm whether a process of adjusting the image forming unit or repair and replacement needs to be performed, before the color adjustment using the profile is performed. Meanwhile, it may be possible to cause the single image forming apparatus 10 to print out a plurality of color charts to determine unevenness of the single image forming apparatus 10 and cause the image reading apparatus to perform read and color adjustment, or it may be possible to cause the plurality of image forming apparatuses 10 to print a plurality of color charts, cause the image reading apparatus to collectively read the color charts, and collectively perform color adjustment on the image forming apparatuses 10.

Overview of Operation of Image Forming System

Figure 13:
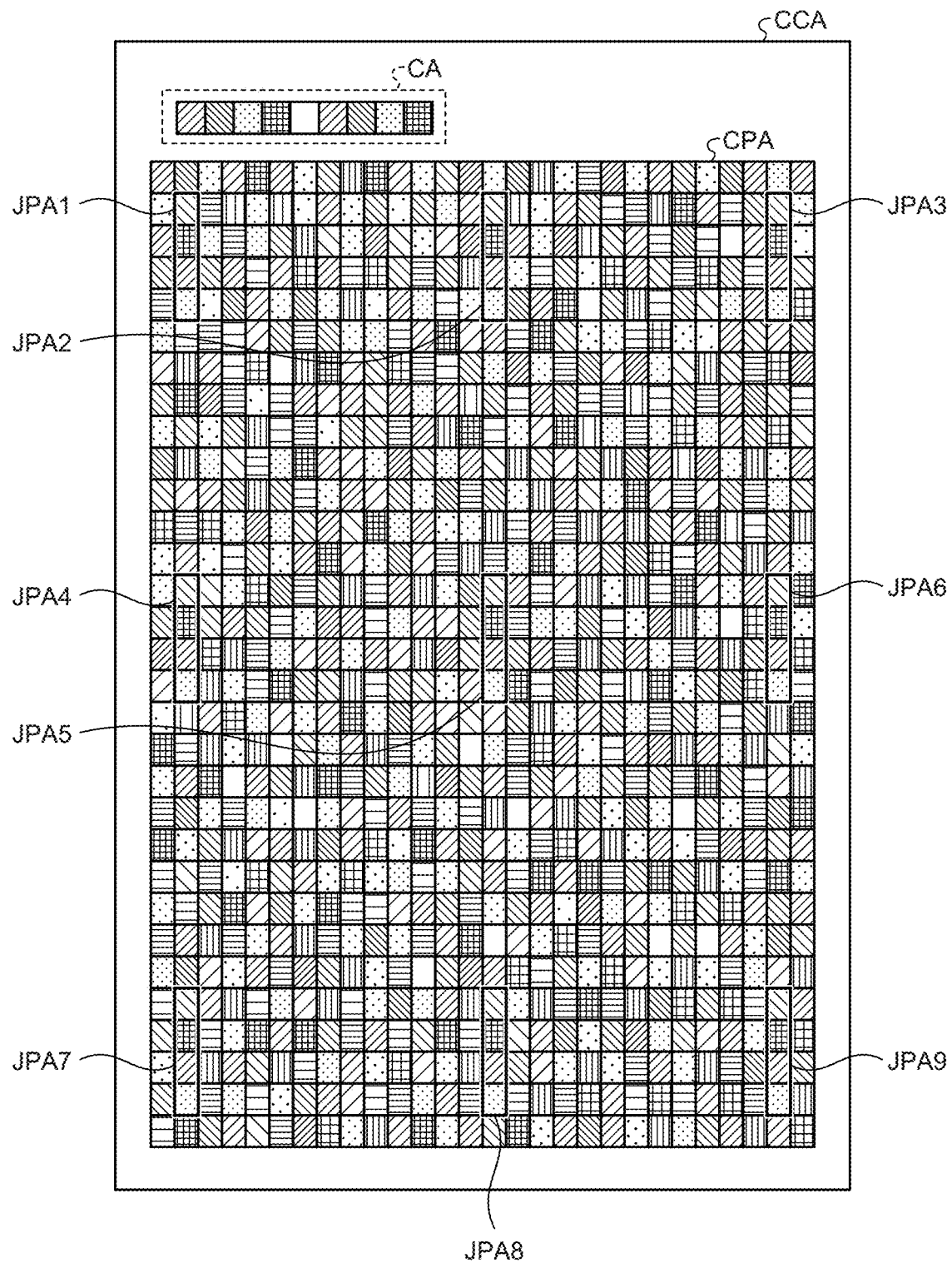
FIG. 13 is a diagram illustrating an example of a first color chart.
Figure 14:
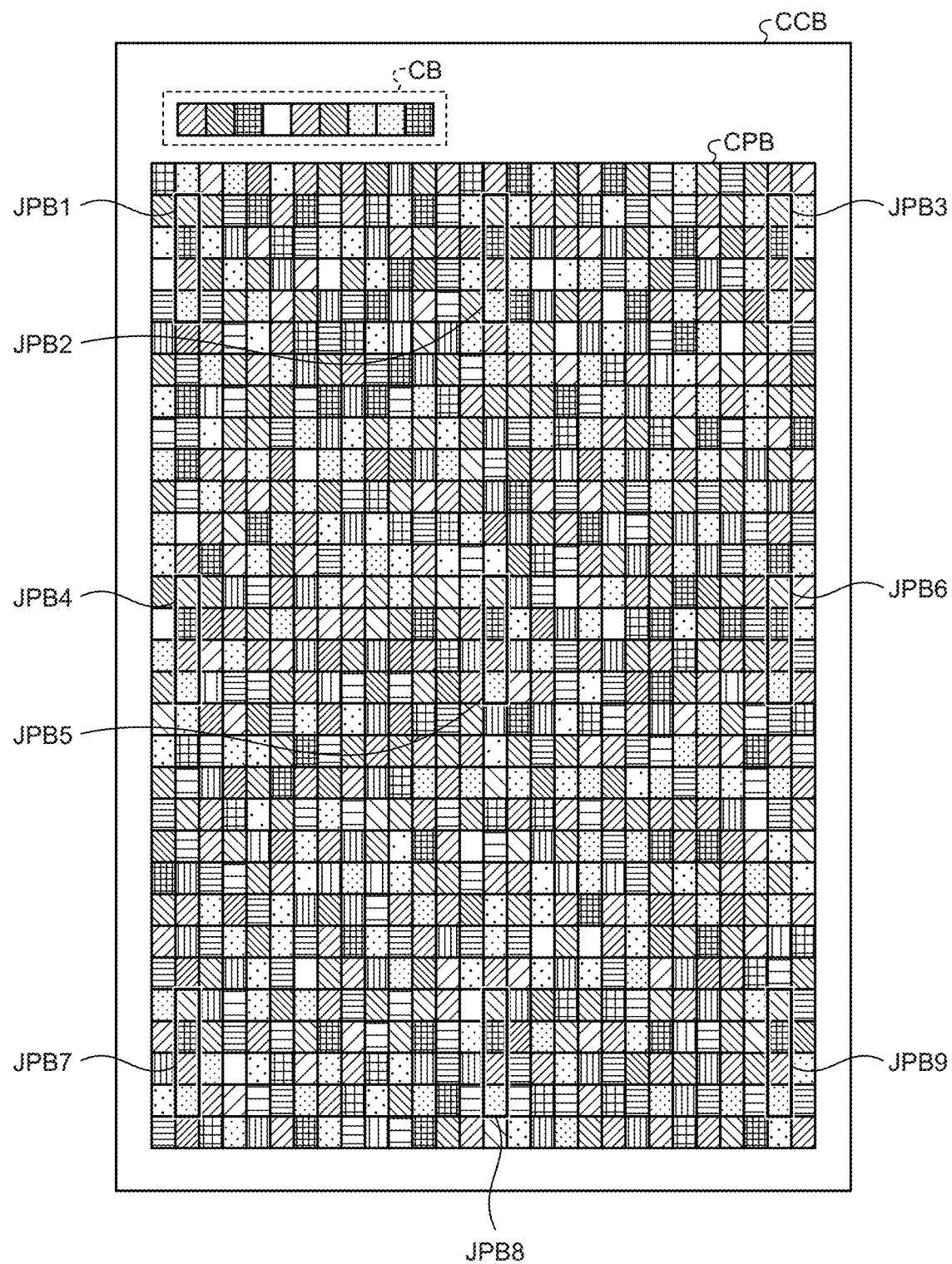
FIG. 14 is a diagram illustrating an example of a second color chart.

FIG. 13 is a diagram illustrating an example of a first color chart. FIG. 14 is a diagram illustrating an example of a second color chart. In the present embodiment, an overview of the operation performed by the image forming system 1 will be described based on the assumption that the unevenness determination process is performed by using two color charts. Meanwhile, the same operation as described below is performed in an unevenness determination process using three or more color charts.

The job acquisition unit 102 of the image forming apparatus 10 acquires print jobs of two pieces of color chart data from the information processing apparatus 20. The print control unit 103 of the image forming apparatus 10 causes the plotter 531 to print out the two color charts on the basis of the print jobs of the two pieces of color chart data acquired by the job acquisition unit 102. Furthermore, when causing the two color charts to be printed out, the print control unit 103 causes color codes each including identification information on the image forming apparatus 10, identification information on a paper type, date and time of printing, and identification information on the patch arrangement of the color charts to be printed. In this case, the two color charts are distinguished from each other by, for example, page identification information on the color chart, which is the identification information on the patch arrangement included in the printed color codes.

Here, a first color chart CCA is illustrated in FIG. 13 and a second color chart CCB is illustrated in FIG. 14 as examples of the two color charts that are printed out under the control of the print control unit 103. As illustrated in FIG. 13, the color chart CCA includes a color code CA and a color adjustment patch CPA, similarly to the first embodiment. As illustrated in FIG. 14, the color chart CCB includes a color code CB and a color adjustment patch CPB similarly to the first embodiment.

Each of the color codes CA and CB is a code in which, as described above, the identification information on the image forming apparatus 10 that has printed out each of the color charts CCA and CCB, the identification information on the paper type used for printing, the date and time of printing, and the identification information on arrangement of each of the color adjustment patches CPA and CPB are coded as the color patches. Similarly to the first embodiment, color patches that indicate ends of each of the color codes CA and CB and that identify orientation of each of the color codes CA and CB are arranged at both ends of each of the color codes CA and CB.

Each of the color adjustment patches CPA and CPB is a group of color patches for use to perform, by the information processing apparatus 20, the color adjustment process on the image forming apparatus 10 that is identified by each of the color codes CA and CB. In the color adjustment patch CPA, as illustrated in FIG. 13, determination patches JPA1 to JPA9 are embedded at nine positions as the determination patches for evaluating in-plane unevenness on the sheet on which the color chart CCA is printed. In the color adjustment patch CPB, as illustrated in FIG. 14, determination patches JPB1 to JPB9 are embedded at nine positions as the determination patches for evaluating in-plane unevenness on the sheet on which the color chart CCB is printed. The configurations of the determination patches JPA1 to JPA9 and the determination patches JPB1 to JPB9 are the same as those of the first embodiment as described above.

The calculation unit 206 of the information processing apparatus 20 calculates an average value or the like of the color measurement values for each of the patches P1 to P4 in the determination patches JPA1 to JPA9 and the determination patches JPB1 to JPB9 acquired by the patch acquisition unit 205. Specifically, assuming that, with respect to the color chart CCA, the color measurement values (Lab values) of the patches P1 in the determination patches JPA1 to JPA9 are represented by (L*A1_1, a*A1_1, b*A1_1), (L*A1_2, a*A1_2, b*A1_2), . . . , and (L*A1_9, a*A1_9, b*A1_9), the calculation unit 206 first calculates an average color measurement value (L*A1_ave, a*A1_ave, b*A1_ave) that is an average value of the color measurement values of the patches P1 by Expression (3) below.

$$L^*A1\_ave = \frac{1}{9}\sum_{i=1}^{9} L^*A1\_i, \quad a^*\_A1\_ave = \frac{1}{9}\sum_{i=1}^{9} a^*\_A1\_i, \quad (3)$$

$$b^*\_A1\_ave = \frac{1}{9}\sum_{i=1}^{9} b^*\_A1\_i$$

Furthermore, assuming that, with respect to the color chart CCB, the color measurement values (Lab values) of the patches P1 in the determination patches JPB1 to JPB9 are represented by (L*B1_1, a*B1_1, b*B1_1), (L*B1_2, a*B1_2, b*B1_2), . . . , and (L*B1_9, a*B1_9, b*B1_9), the calculation unit 206 calculates an average color measurement value (L*B1_ave, a*B1_ave, b*B1_ave) that is an average value of the color measurement values by Expression (4) below.

$$L^*B1\_ave = \frac{1}{9}\sum_{i=1}^{9} L^*B1\_i, \quad a^*\_B1\_ave = \frac{1}{9}\sum_{i=1}^{9} a^*\_B1\_i, \quad (4)$$

$$b^*\_B1\_ave = \frac{1}{9}\sum_{i=1}^{9} b^*\_B1\_i$$

Subsequently, with respect to the color chart CCA, the calculation unit 206 calculates, as ΔEA1_1 to ΔEA1_9, color differences between the color measurement values (Lab values) (L*A1_1, a*A1_1, b*A1_1) to (L*A1_9, a*A1_9, b*A1_9) of the patches P1 in the determination patches JPA1 to JPA9 and the calculated average color measurement value (L*A1_ave, a*A1_ave, b*A1_ave). Then, the calculation unit 206 calculates the maximum value ΔEA1_Max among the calculated color differences ΔEA1_1 to ΔEA1_9. Similarly, the calculation unit 206 calculates maximum values ΔEA2 Max to ΔEA4_Max by using the color measurement values (Lab values) of the patches P2 to P4 in the determination patches JPA1 to JPA9.

Furthermore, with respect to the color chart CCB, the calculation unit 206 calculates, as ΔEB1_1 to ΔEB1_9, color differences between the color measurement values (Lab values) (L*B1_1, a*B1_1, b*B1_1) to (L*B1_9, a*B1_9, b*B1_9) of the patches P1 in the determination patches JPB1 to JPB9 and the calculated average color measurement value (L*B1_ave, a*B1_ave, b*B1_ave). Then, the calculation unit 206 calculates the maximum value ΔEB1_Max among the calculated color differences ΔEB1_1 to ΔEB1_9. Similarly, the calculation unit 206 calculates maximum values ΔEB2_Max to ΔEB4_Max by using the color measurement values (Lab values) of the patches P2 to P4 in the determination patches JPB1 to JPB9.

Furthermore, the calculation unit 206 calculates a difference ΔE1 AB between the average color measurement value (L*A1_ave, a*A1_ave, b*A1_ave) of the color chart CCA and the average color measurement value (L*B1_ave, a*B1_ave, b*B1_ave) of the color chart CCB. Similarly, the calculation unit 206 calculates differences ΔE2 AB to ΔE4 AB by using the color measurement values (Lab values) of the patches P1 to P4 in the determination patches JPA1 to JPA9 and the determination patches JPB1 to JPB9.

The determination unit 207 of the information processing apparatus 20 determines whether the maximum values ΔEA1_Max to ΔEA4_Max calculated by the calculation unit 206 are equal to or larger than the respective predetermined thresholds Thresh by Expression (2) above. Furthermore, the determination unit 207 determines whether the maximum values ΔEB1_Max to ΔEB4_Max calculated by the calculation unit 206 are equal to or larger than the respective predetermined thresholds Thresh by Expression (2) above.

The determination unit 207 determines whether the differences ΔE1_AB to ΔE4_AB calculated by the calculation unit 206 are equal to or larger than predetermined thresholds Thresh2 by Expressions (5) below.

$$\begin{cases} \Delta E1\_AB \geq Thresh2 \\ \Delta E2\_AB \geq Thresh2 \\ \Delta E3\_AB \geq Thresh2 \\ \Delta E4\_AB \geq Thresh2 \end{cases} \quad (5)$$

If at least one of Expressions (2) above is satisfied with respect to the maximum values ΔEA1_Max to ΔEA4_Max and the maximum values ΔEB1_Max to ΔEB4_Max or if at least one of Expressions (5) above is satisfied with respect to the differences ΔE1_AB to ΔE4_AB, the determination unit 207 determines that unevenness is present in the color adjustment patches CPA and CPB included in the color charts CCA and CCB, and determines that the state of the image forming apparatus 10 identified by the identification unit 204 is abnormal. Meanwhile, in Expressions (5), the thresholds Thresh2 for the differences ΔE1 AB to ΔE4 AB need not always be the same value, but at least any of the thresholds may be set to a different value.

Operation of the other functional units of the image forming apparatus 10 and the information processing apparatus 20 are the same as the operation described in the first embodiment.

Flow of Unevenness Determination Process

Figure 15:
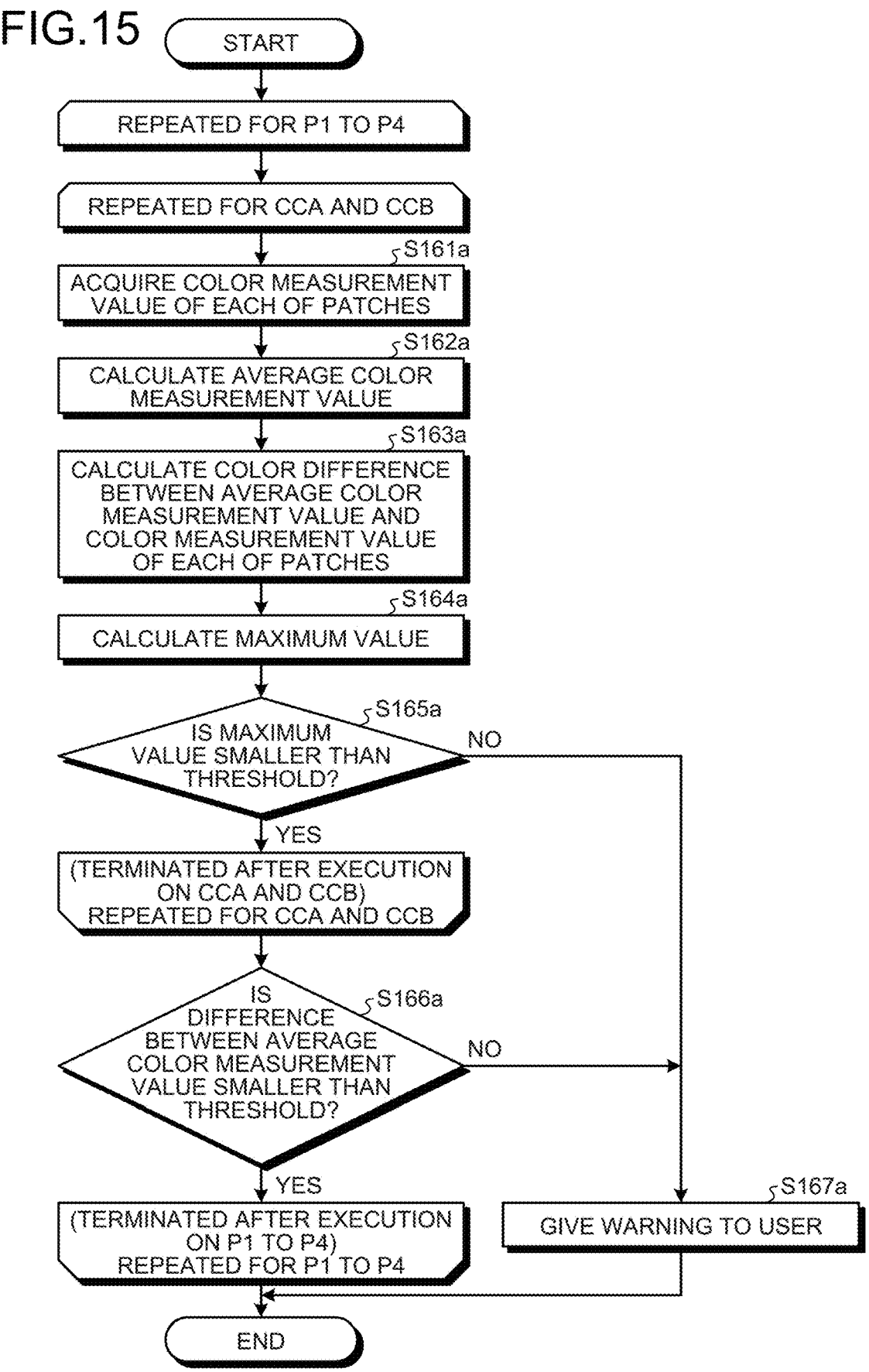
FIG. 15 is a diagram illustrating an example of the flow of an unevenness determination process performed by an information processing apparatus according to a second embodiment.
Figure 16:
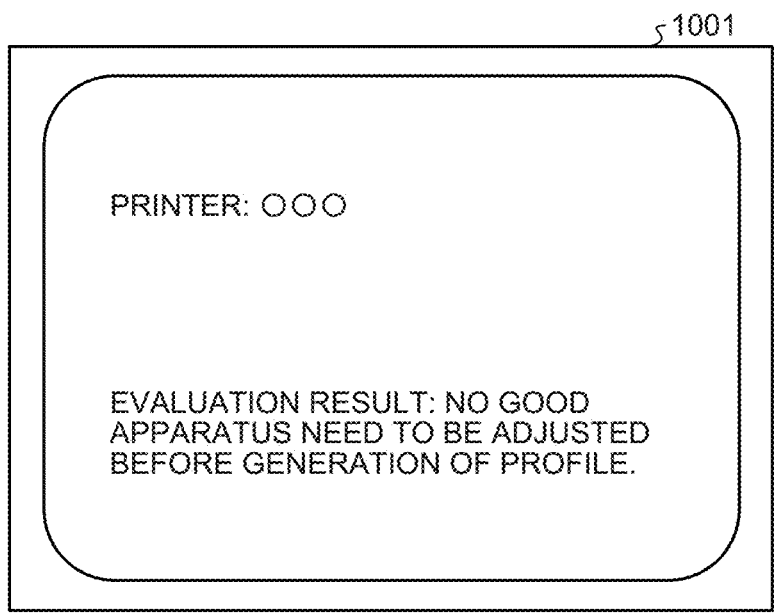
FIG. 16 is a diagram illustrating an example of an inter-page evaluation abnormality screen.

FIG. 15 is a diagram illustrating an example of the flow of the unevenness determination process performed by the information processing apparatus according to the second embodiment. FIG. 16 is a diagram illustrating an example of an inter-page evaluation abnormality screen. With reference to FIG. 15 and FIG. 16, the unevenness determination process performed by the information processing apparatus 20 in the color adjustment process performed by the image forming system 1 according to the present embodiment will be described. Meanwhile, in the present embodiment, the unevenness determination process illustrated in FIG. 15 is performed at Step S16 in the color adjustment process illustrated in FIG. 8.

<Step S161a>

The patch acquisition unit 205 of the information processing apparatus 20 identifies portions corresponding to the determination patches JPA1 to JPA9 at the nine positions embedded in the color adjustment patch CPA from the color information data of the color chart CCA acquired by the color value acquisition unit 203, and acquires the color measurement value (Lab value) of the patch P1 in each of the determination patches JPA1 to JPA9. Then, the process proceeds to Step S162a.

<Step S162a>

The calculation unit 206 of the information processing apparatus 20 calculates the average color measurement value (L*A1_ave, a*A1_ave, b*A1_ave) that is an average value of the color measurement values of the patches P1 in the determination patches JPA1 to JPA9 acquired by the patch acquisition unit 205, by Expression (3) above. Then, the process proceeds to Step S163a.

<Step S163a>

Subsequently, the calculation unit 206 calculates, as ΔEA1_1 to ΔEA1_9, the color differences between the color measurement values (Lab values) (L*A1_1, a*A1_1, b*A1_1) to (L*A1_9, a*A1_9, b*A1_9) of the patches P1 in the determination patches JPA1 to JPA9 and the calculated average color measurement value (L*A1_ave, a*A1_ave, b*A1_ave) with respect to the color chart CCA. Then, the process proceeds to Step S164a.

<Step S164a>

The calculation unit 206 calculates the maximum value ΔEA1_Max among the calculated color differences ΔEA1_1 to ΔEA1_9. Then, the process proceeds to S165a.

<Step S165a>

The determination unit 207 of the information processing apparatus 20 determines whether the maximum value ΔEA1_Max calculated by the calculation unit 206 is equal to or larger than the predetermined threshold Thresh by Expression (2) above. If the maximum value ΔEA1_Max is smaller than the threshold Thresh (YES at Step S165a), the process returns to Step S161a to perform the process on the patch P1 in the color chart CCB, and repeats the processes from Steps S161a to S165a, and, if the process on the patch P1 in the color chart CCb is completed, the process proceeds to Step S166a. In contrast, if the maximum value ΔEA1_Max is equal to or larger than the threshold Thresh (NO at Step S165a), the process proceeds to Step S167a.

<Step S166a>

Furthermore, the determination unit determines whether the difference ΔE1 AB calculated by the calculation unit 206 is is equal to or larger than the predetermined threshold Thresh2 by Expression (5) above. If the difference ΔE1 AB is smaller than the threshold Thresh2 (Yes at Step S166a), and if any of the patches P2 to P4 of the color charts CCA and CCB is not subjected to the process, the process returns to Step S161a, and the processes from Steps S161a to S167a are repeated. If the process on all of the patches P2 to P4 is completed, the unevenness determination process is terminated and the process proceeds to Step S17 in FIG. 8. In contrast, if the difference ΔE1_AB is equal to or larger than the threshold Thresh2 (NO at Step S166a), the process proceeds to Step S167a.

<Step S167a>

If it is determined that the maximum value ΔEA1_Max is equal to or larger than the threshold Thresh or if it is determined that the difference ΔE1_AB is equal to or larger than the predetermined threshold Thresh2, the determination unit 207 determines that unevenness is present in the color adjustment patches CPA and CPB included in the color charts CCA and CCB, and determines that the state of the image forming apparatus 10 identified by the identification unit 204 is abnormal. In this case, if it is determined that the maximum value ΔEA1_Max is equal to or larger than the threshold Thresh, the display control unit 211 of the information processing apparatus 20 causes the display unit 212 to display the unevenness determination abnormality screen 1000 indicating that unevenness is present in the color adjustment patch CP as illustrated in FIG. 12 as described above to thereby give a warning to a user. Furthermore, if it is determined that the difference ΔE1_AB is equal to or larger than the predetermined threshold Thresh2, the display control unit 211 causes the display unit 212 to display an inter-page evaluation abnormality screen 1001 as illustrated in FIG. 16 indicating that the color values are changed between the pages (the color charts CCA and CCB) to thereby give a warning to the user. Then, the unevenness determination process is terminated and the process proceeds to Step S17. Meanwhile, it may be possible to display a page and a determination patch in which specifically large unevenness has occurred, by using the page identification information and the information on the position of the determination patch, which are included in the color code on each of the pages of the plurality of color charts CC.

As described above, in the image forming system 1 according to the present embodiment, the single image forming apparatus 10 or each of the image forming apparatuses 10 prints out the plurality of color charts CC, determines presence or absence of in-plane unevenness by using each of the color charts CC, and determines presence or absence of color variation among the plurality of color charts CC (among the pages). With this configuration, it is possible to perform color adjustment after confirming that the image forming apparatus 10 is in a more appropriate state. Furthermore, it may be possible to perform, before the color adjustment, a calibration process for optimizing colors of the image forming apparatus 10 or appropriate operation, such as repair or replacement, related to image formation, in accordance with a result of determining presence or absence of the in-plane unevenness.

Meanwhile, in each of the embodiments as described above, if at least any of the functional units of the image forming apparatus 10 and the information processing apparatus 20 is implemented by a program, the program is provided by being incorporated in ROM or the like in advance. Furthermore, in each of the embodiments as described above, the program executed by the image forming apparatus 10 and the information processing apparatus 20 may be provided by being recorded in a computer readable recording medium, such as a compact disc read only memory (CD-ROM), a flexible disk (FD), or a digital versatile disk (DVD) in a computer-installable or a computer-executable file format. Moreover, in each of the embodiments as described above, the program executed by the image forming apparatus 10 and the information processing apparatus 20 may be stored in a computer connected to a network, such as the Internet, and may be provided by being downloaded via the network. Furthermore, in each of the embodiments as described above, the program executed by the image forming apparatus 10 and the information processing apparatus 20 may be provided or distributed via a network, such as the Internet. Moreover, in each of the embodiments as described above, the program executed by the image forming apparatus 10 and the information processing apparatus 20 has a module structure including at least any of the functional units as described above, and as actual hardware, the CPU 501 (the CPU 601) reads the program from the storage device as described above (for example, the system memory 502, the auxiliary storage device 508, the auxiliary storage device 605, or the like) and executes the program, so that each of the functional units as described above is loaded and generated on a main storage device.

According to an embodiment, it is possible to effectively perform color adjustment by using a color chart by which an image forming apparatus that has performed output can be identified.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A color chart for performing color adjustment of an image forming apparatus, the color chart comprising:
    identification information of an image forming apparatus to which color adjustment is to be applied, the identification information included in a color code including
        a plurality of first color patches of a plurality of colors, and
        second color patches of fixed colors at both ends of the color code in a color patch arrangement direction;
    a color adjustment patch including a plurality of third color patches for performing color adjustment on the image forming apparatus indicated by the identification information; and
    a plurality of determination patches, each determination patch of the plurality of determination patches including a color patch for determining presence or absence of in-plane unevenness in the color chart and each determination patch being adjacent to neither a portion of white paper of the color chart nor a white color patch,
    wherein the color adjustment patch and the determination patch are arranged at mutually independent positions.

2. The color chart according to claim 1, wherein the color code further includes information on a paper type of a sheet on which the color chart is output.

3. The color chart according to claim 1, wherein each of the plurality of determination patches includes a plurality of fourth color patches in a same arrangement.

4. The color chart according to claim 1, wherein the color code further includes page information on the color chart.

5. The color chart according to claim 1, wherein the first color patches of the color code are arranged so as not to have a same color as a color of an adjacent color patch.

6. An information processing apparatus comprising:
    processing circuitry configured to
        acquire color information data generated by reading, by an image reading apparatus, a color chart output from an image forming apparatus, the color chart including
            identification information of the image forming apparatus to which color adjustment is to be applied, the identification information included in a color code including
                a plurality of first color patches of a plurality of colors, and
                second color patches of fixed colors at both ends of the color code in a color patch arrangement direction,
            a color adjustment patch including a plurality of third color patches for performing color adjustment on the image forming apparatus, and
            a plurality of determination patches arranged in a plane of the color chart, each of the plurality of determination patches including a color patch for determining presence or absence of in-plane unevenness in the color chart and each determination patch being adjacent to neither a portion of white paper of the color chart nor a white color patch, the color adjustment patch and each of the plurality of determination patches being arranged at mutually independent positions;
        identify the image forming apparatus from the identification information included in the color information data; and
        generate a profile to be applied to the image forming apparatus, based on a color measurement value of the color adjustment patch included in the color information data.

7. The information processing apparatus according to claim 6, wherein
    the processing circuitry is configured to identify the image forming apparatus from the color code included in the color information data.

8. The information processing apparatus according to claim 7, wherein
    the color code further includes information on a paper type of a sheet on which the color chart is output,
    the processing circuitry is configured to
        identify the image forming apparatus and the paper type from the color code included in the color information data, and
        generate the profile to be applied to the paper type of the image forming apparatus, based on the color measurement value of the color adjustment patch included in the color information data.

9. The information processing apparatus according to claim 7, wherein
    the processing circuitry is configured to
        determine presence or absence of the in-plane unevenness in the color chart, based on color measurement values of the plurality of determination patches included in the color information data, and
        generate the profile to be applied to the image forming apparatus identified by the color code, in response to determining that no in-plane unevenness in the color chart is present.

10. The information processing apparatus according to claim 9, wherein
    the plurality of determination patches are arranged in the plane of the color chart,
    each of the plurality of determination patches includes a plurality of fourth color patches in a same arrangement, and
    the processing circuitry is configured to
        calculate average values of color measurement values of the fourth color patches at corresponding positions in the plurality of determination patches, and
        determine presence or absence of the in-plane unevenness in the color chart, based on the average values.

11. The information processing apparatus according to claim 10, wherein the processing circuitry is configured to
    calculate maximum values among color differences between color measurement values of the fourth color patches at corresponding positions in the plurality of determination patches, and an average value of the color measurement values, and
    determine that the in-plane unevenness in the color chart is present, in response to at least any of the maximum values being equal to or greater than a threshold.

12. The information processing apparatus according to claim 7, wherein
    the processing circuitry is configured to rotate the color information data in accordance with arrangement of the second color patches of the fixed colors in the color code included in the color information data.

13. The information processing apparatus according to claim 9, wherein
the color code further includes page information on the color chart,
the color chart includes a plurality of color charts output from the image forming apparatus, and
the processing circuitry is configured to
identify the image forming apparatus and the page information from the color code included in the color information data of each of the plurality of color charts, and
determine presence or absence of color variation between the plurality of color charts each corresponding to one of pieces of page information corresponding to the same image forming apparatus, based on color measurement values of determination patches in color information data for the pieces of page information.

14. The information processing apparatus according to claim 9, wherein the processing circuitry is configured to display an abnormality in response determining that the abnormality is present.

15. The information processing apparatus according to claim 7, wherein the first color patches of the color code are arranged so as not to have a same color as a color of an adjacent color patch.

16. An information processing system comprising:
an image forming apparatus to which color adjustment is to be applied, the image forming apparatus being configured to output a color chart including
identification information of the image forming apparatus, the identification information included in a color code including
a plurality of first color patches of a plurality of colors, and
second color patches of fixed colors at both ends of the color code in a color patch arrangement direction,
a color adjustment patch including a plurality of third color patches for performing color adjustment on the image forming apparatus, and
a plurality of determination patches arranged in a plane of the color chart, each of the plurality of determination patches including fourth color patches for determining presence or absence of in-plane unevenness in the color chart and each determination patch being adjacent to neither a portion of white paper of the color chart nor a white color patch, the color adjustment patch and each of the plurality of determination patches being arranged at mutually independent positions;
an image reading apparatus configured to read the color chart output by the image forming apparatus and generate color information data; and
an information processing apparatus including:
processing circuitry configured to
acquire the color information data generated by the image reading apparatus;
identify the image forming apparatus from the identification information included in the color information data; and
generate a profile to be applied to the image forming apparatus based on a color measurement value of the color adjustment patch included in the color information data.

17. A color chart for performing color adjustment of an image forming apparatus, the color chart comprising:
identification information of an image forming apparatus to which color adjustment is to be applied, the identification information included in a color code including
a plurality of first color patches of a plurality of colors, and
second color patches of fixed colors at both ends of the color code in a color patch arrangement direction;
a color adjustment patch including a plurality of third color patches for performing color adjustment on the image forming apparatus indicated by the identification information; and
a plurality of determination patches, each determination patch of the plurality of determination patches including a color patch for determining presence or absence of in-plane unevenness n the color chart and each determination patch being adjacent to neither a portion of white paper of the color chart nor a white color patch.

18. An information processing apparatus comprising:
processing circuitry configured to
acquire color information data generated by reading, by an image reading apparatus, a color chart output from an image forming apparatus, the color chart including
identification information of the image forming apparatus to which color adjustment is to be applied, the identification information included in a color code including
a plurality of first color patches of a plurality of colors, and
second color patches of fixed colors at both ends of the color code in a color patch arrangement direction,
a color adjustment patch including a plurality of third color patches for performing color adjustment on the image forming apparatus, and
a plurality of determination patches, each determination patch of the plurality of determination patches including a color patch for determining presence or absence of in-plane unevenness in the color chart and each determination patch being adjacent to neither a portion of white paper of the color chart nor a white color patch,
identify the image forming apparatus from the identification information included in the color information data; and
generate a profile to be applied to the image forming apparatus, based on a color measurement value of the color adjustment patch included in the color information data.

19. An information processing system comprising:
an image forming apparatus to which color adjustment is to be applied, the image forming apparatus being configured to output a color chart including
identification information of the image forming apparatus, the identification information included in a color code including
a plurality of first color patches of a plurality of colors, and
second color patches of fixed colors at both ends of the color code in a color patch arrangement direction,
a color adjustment patch including a plurality of third color patches for performing color adjustment on the image forming apparatus, and
a plurality of determination patches, each determination patch of the plurality of determination patches including a color patch for determining presence or absence of in-plane unevenness in the color chart and each determination patch being adjacent to neither a portion of white paper of the color chart nor a white color patch;

an image reading apparatus configured to read the color chart output by the image forming apparatus and generate color information data; and an information processing apparatus including:
  processing circuitry configured to
  acquire the color information data generated by the image reading apparatus;
    identify the image forming apparatus from the identification information included in the color information data; and
    generate a profile to be applied to the image forming apparatus based on a color measurement value of the color adjustment patch included in the color information data.

* * * * *